(12) United States Patent
Baek et al.

(10) Patent No.: US 11,304,162 B2
(45) Date of Patent: Apr. 12, 2022

(54) V2X COMMUNICATION APPARATUS AND DATA COMMUNICATION METHOD THEREFOR

(71) Applicant: LG Electronics Inc., Seoul (KR)

(72) Inventors: Jongseob Baek, Seoul (KR); Woosuk Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/474,402

(22) PCT Filed: Dec. 27, 2016

(86) PCT No.: PCT/KR2016/015317
§ 371 (c)(1),
(2) Date: Jun. 27, 2019

(87) PCT Pub. No.: WO2018/124320
PCT Pub. Date: Jul. 5, 2018

(65) Prior Publication Data
US 2019/0349874 A1   Nov. 14, 2019

(51) Int. Cl.
*H04W 56/00*   (2009.01)
*H04W 4/40*   (2018.01)
*H04W 72/04*   (2009.01)
*H04W 88/06*   (2009.01)

(52) U.S. Cl.
CPC ........... *H04W 56/002* (2013.01); *H04W 4/40* (2018.02); *H04W 56/0025* (2013.01); *H04W 72/0406* (2013.01); *H04W 88/06* (2013.01)

(58) Field of Classification Search
None
See application file for complete search history.

(56) References Cited

U.S. PATENT DOCUMENTS

| 8,400,987 B2* | 3/2013 | Holland | ............ H04W 72/1221 370/336 |
|---|---|---|---|
| 9,147,294 B1* | 9/2015 | Weinfield | .............. H04W 4/027 |
| 2011/0128849 A1* | 6/2011 | Guo | ....................... H04W 28/10 370/235 |
| 2011/0294424 A1 | 12/2011 | Hu et al. | |

(Continued)

OTHER PUBLICATIONS

Sahoo et al., "SVANET: A Smart Vehicular Ad Hoc Network for Efficient Data Transmission with Wireless Sensors," Sensors 2014, Nov. 25, 2014, pp. 22230-22260.

(Continued)

*Primary Examiner* — Christopher T Wyllie
(74) *Attorney, Agent, or Firm* — Fish & Richardson P.C.

(57) ABSTRACT

A data communication method for a V2X communication apparatus is disclosed. A data communication method for a V2X communication apparatus including a plurality of transceivers according to an embodiment of the present invention comprises the steps of: receiving service advertisement information over a control channel (CCH) by using a first transceiver; and receiving, on the basis of the service advertisement information, service data over a service channel (SCH) by using a second transceiver, wherein accessing the control channel is performed on the basis of a sync interval, and the sync interval includes a first time unit and a second time unit.

7 Claims, 26 Drawing Sheets

(56) References Cited

U.S. PATENT DOCUMENTS

| | | | | |
|---|---|---|---|---|
| 2012/0093091 A1* | 4/2012 | Kang | ............ | H04W 4/90 |
| | | | | 370/329 |
| 2015/0305038 A1 | 10/2015 | Du et al. | | |
| 2016/0112856 A1* | 4/2016 | Han | ............ | H04L 67/12 |
| | | | | 455/404.1 |
| 2017/0086081 A1* | 3/2017 | Kim | ............ | H04W 4/027 |
| 2018/0295655 A1* | 10/2018 | Cavalcanti | ............ | H04W 12/35 |
| 2019/0174344 A1* | 6/2019 | Karella | ............ | H04L 43/062 |
| 2019/0320380 A1* | 10/2019 | Nylander | ............ | H04W 48/16 |
| 2020/0092796 A1* | 3/2020 | Baek | ............ | H04W 8/005 |

OTHER PUBLICATIONS

Boban et al., "Service-actuated multi-channel operation for vehicular communications," Computer Communications, Nov. 1, 2016, 93: 17-26.

C. Campolo and A. Molinaro, "Multichannel communications in vehicular Ad Hoc networks: a survey," IEEE Communications Magazine, May 2013, 51:5, 12 pages.

Choi et al., "Concurrent Dual-channel RF Transceiver Module with Diversity for 802.11p WAVE," IEEE, 2012, 5 pages.

Extended European Search Report in European Appln. No. 16925382.0, dated Jul. 14, 2020, 8 pages.

\* cited by examiner (a)

| Bits | Usage | Safety interval | Non-safety interval |
|---|---|---|---|
| 0000 | only safety | 1 | 0 |
| 0001 | only non-safety | 0 | 1 |
| 0010 | safety=non-safety | 1 | 1 |
| 0011 | safety>non-safety | 2 | 1 |
| 0100 | safety>non-safety | 3 | 1 |
| 0101 | safety>non-safety | 4 | 1 |
| 0110 | safety<non-safety | 1 | 2 |
| 0111 | safety<non-safety | 1 | 3 |
| 1000 | safety<non-safety | 1 | 4 |
| reserved bit | | | |

| Name | Type | Valid range |
|---|---|---|
| Channel Identifier | IEEE std 802.11 | IEEE std 802.11 |
| Time Slot | IEEE std 802.11 | IEEE std 802.11 |
| OperationalRateSet | IEEE std 802.11 | IEEE std 802.11 |
| EDCA Parameter Set | IEEE std 802.11 | IEEE std 802.11 |
| Immediate Access | Integer | 0-255 |
| Enhanced Mode Access | Integer | 0-2 |
| Time Interval Value | Integer | 0-15 |

V2X COMMUNICATION APPARATUS AND DATA COMMUNICATION METHOD THEREFOR

CROSS-REFERENCE TO RELATED APPLICATIONS

This application is a National Stage application under 35 U.S.C. § 371 of International Application No. PCT/KR2016/015317, filed on Dec. 27, 2016, the disclosures of which is incorporated by reference in its entirety.

TECHNICAL FIELD

The present invention relates to a device and method for V2X communication and, more particularly, to a multi-channel access method and data communication method of a V2X device, which includes a plurality of transceivers.

BACKGROUND ART

Nowadays, vehicles are becoming from a product of Mechanical Engineering to a product of complex industrial technology in which electrical technology, electronic technology, and communication technology are fused and in this regard, the vehicle is called a smart car. The smart car connects a driver, a vehicle, and a traffic infrastructure to provide various user customized mobile services as well as traditional vehicle technology, such as traffic safety/jam solution. Such connectivity may be implemented using vehicle to everything (V2X) communication technology.

DISCLOSURE

Technical Problem

Various services may be provided through V2X communication. Also, to provide various services, a plurality of frequency bands are used. In such an environment, considering vehicle-specific characteristics, delivery and provision of a safety service in a highly reliable manner is a very important issue. In particular, for multi-channel access, flexible and efficient allocation of intervals and multi-channel operation method based on the allocation are needed.

Technical Solution

To solve the technical problem above, a data communication method of a V2X communication device including a plurality of transceivers according to an embodiment of the present invention may comprise receiving service advertisement information through a control channel (CCH) by using a first transceiver; and receiving service data through a service channel (SCH) based on the service advertisement information by using a second transceiver, wherein access to the control channel is performed based on a sync interval, and the sync interval may include a first time unit and a second time unit.

Also, in a data communication method according to an embodiment of the present invention, the first time unit may include a safety interval for safety-related service communication, and the second time unit may include a non-safety interval for non-safety related service communication.

Also, in a data communication method according to an embodiment of the present invention, the service advertisement information may be received during the first time unit or second time unit.

Also, in a data communication method according to an embodiment of the present invention, the second time unit may further include a critical safety interval for safety-related service communication of high importance.

Also, in a data communication method according to an embodiment of the present invention, time-critical non-safety related service communication may be performed first during the second time unit.

To solve the technical problem, a V2X communication device according to an embodiment of the present invention may comprise a memory storing data; an RF unit transmitting and receiving a radio signal; and a processor controlling the RF unit, wherein the RF unit includes a first transceiver for control channel (CCH) communication and a second transceiver for service channel (SCH) communication; and the V2X communication device is configured to receive service advertisement information through the control channel by using the first transceiver; and to receive service data through the service channel based on the service advertisement information by using the second transceiver, wherein access to the control channel is performed based on a sync interval, and the sync interval may include a first time unit and a second time unit.

Also, in a V2X communication device according to an embodiment of the present invention, the first time unit may include a safety interval for safety-related service communication, and the second time unit may include a non-safety interval for non-safety related service communication.

Also, in a V2X communication device according to an embodiment of the present invention, the service advertisement information may be received during the first time unit or second time unit.

Also, in a V2X communication device according to an embodiment of the present invention, the second time unit may further include a critical safety interval for safety-related service communication of high importance.

Also, in a V2X communication device according to an embodiment of the present invention, time-critical non-safety related service communication may be performed first during the second time unit.

Advantageous Effects

According to the present invention, enhanced mode is added for multi-channel operation, and thereby contention of V2X communication and delay in delivering a safety service may be minimized. According to the present invention, as one sync interval including a CCH interval and SCH interval is allocated for CCH access, contention for communication among services may be minimized. Also, since safety-related information and service-related information are communicated in a separate time slot within the sync interval, communication contention among services may be minimized. Also, since the present invention proposes an asynchronous channel access mode, a multi-channel operation method with high resource utilization efficiency may be provided. Also, since the present invention allocates a plurality of transceivers based on individual channels and services, reliable communication may be performed. Other effects of the present invention will be described in what follows.

DESCRIPTION OF DRAWINGS

The accompany drawings, which are included to provide a further understanding of the present invention and are incorporated in and constitute a part of this specification, illustrate embodiments of the present invention and together with the description, serve to explain the principles of the present invention.

FIG. 25 illustrates parameters of MLMEX-CHSTART.request information according to an embodiment of the present invention.

BEST MODE FOR INVENTION

Preferred embodiments of the present invention will be described in detail with reference to the accompanying drawings. The following detailed description with reference to the attached drawings illustrates preferred embodiments of the present invention rather than illustrating only embodiments that may be implemented according to embodiments of the present invention. The following detailed description includes details in order to provide a thorough understanding of the present invention, but the present invention does not require all of these details. In the present invention, embodiments described hereinafter are not intended to be respectively used independently. Multiple embodiments or all embodiments may be used together, and specific embodiments may be used in combination.

Most of terms used in the present invention are selected from general ones widely used in the art, but some terms are optionally selected by an applicant and meanings thereof are described in detail in the following description as needed. Accordingly, the present invention should be understood based on the intended meaning of the term rather than a simple name or meaning of the term.

The present invention relates to a V2X communication device, and the V2X communication device may be included in an Intelligent Transport System (ITS) to perform all or some of functions of the ITS system. The V2X communication device may perform communication with a vehicle and a vehicle, a vehicle and an infrastructure, a vehicle and a bicycle, and mobile devices. The V2X communication device may be abbreviated to a V2X device. In an embodiment, the V2X device may correspond to an On Board Unit (OBU) of a vehicle or may be included in an OBU. The V2X device may correspond to a Road Side Unit (RSU) of an infrastructure or may be included in an RSU. Alternatively, the V2X communication device may correspond to an ITS station or may be included in an ITS station. In an embodiment, the V2X device may operate in a Wireless Access In Vehicular Environments (WAVE) system of IEEE 1609.1 to 4.

Figure 1:
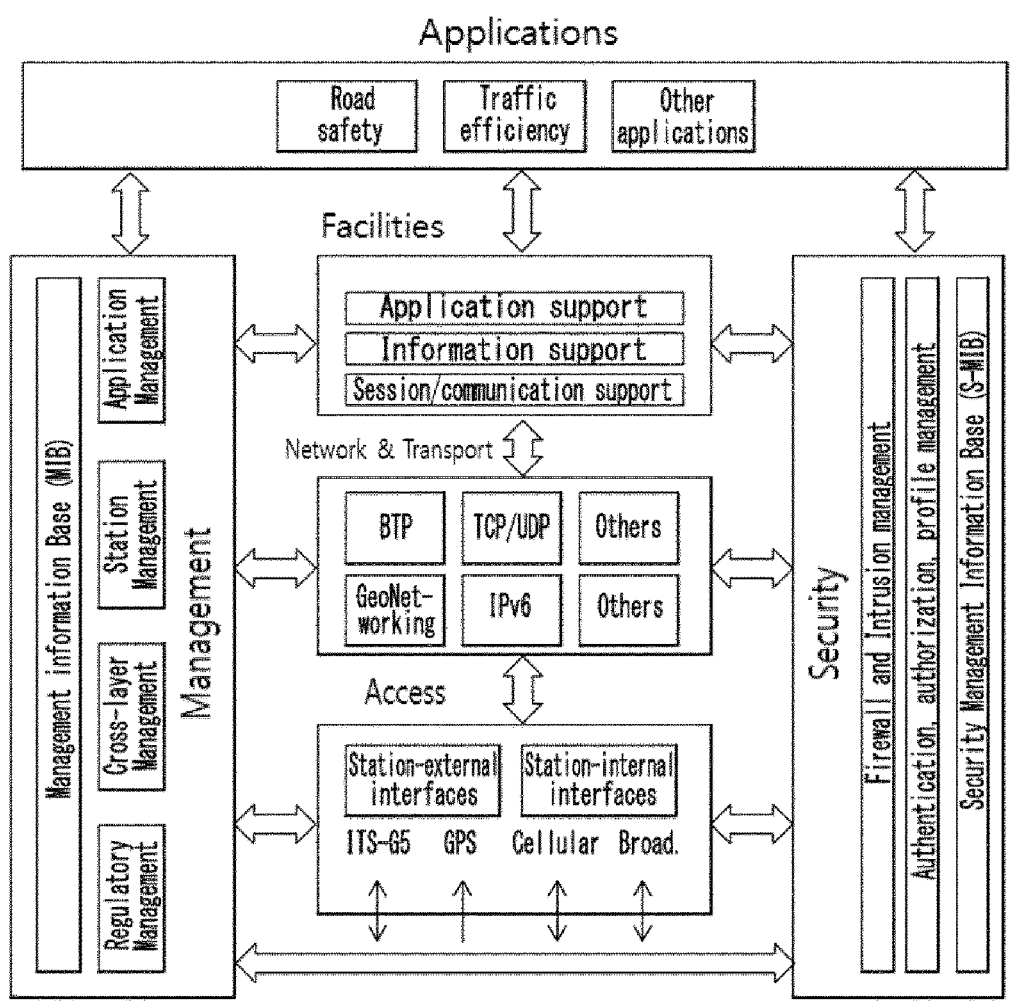
FIG. 1 illustrates a reference architecture of an Intelligent Transport System (ITS) station according to an embodiment of the present invention.

FIG. 1 illustrates a reference architecture of an Intelligent Transport System (ITS) station according to an embodiment of the present invention.

In the architecture of FIG. 1, two end vehicles/users may communicate with a communication network, and such communication may be performed through a function of each layer of the architecture of FIG. 1. For example, when a message between vehicles is communicated, in a transmitting vehicle and an ITS system thereof, by passing through each layer below one layer, data may be transferred, and in a receiving vehicle and an ITS system thereof, by passing through each layer above one layer, data may be transferred. A description of each layer of the architecture of FIG. 1 is as follows.

Application layer: the application layer may implement and support various use cases. For example, the application may provide road safety, efficient traffic information, and other application information.

Facilities layers: the facilities layer may support to effectively realize various use cases defined at the application layer. For example, the facilities layer may perform application support, information support, and session/communication support.

Networking & Transport layer: the networking/transport layer may constitute a network for vehicle communication between homogenous/heterogeneous networks by using various transport protocols and network protocols. For example, the networking/transport layer may provide Internet access and routing using an Internet protocol such as TCP/UDP+IPv6. Alternatively, the networking/transport layer may constitute a vehicle network using a geographical position based protocol such as Basic Transport Protocol (BTP)/GeoNetworking.

Access layer: the access layer may transmit a message/data received from a superordinate layer through a physical channel. For example, the access layer may perform/support data communication based on IEEE 802.11 and/or 802.11p standard based communication technology, ITS-G5 wireless communication technology based on IEEE 802.11 and/or 802.11p standard physical transmission technology, 2G/3G/4G(LTE)/5G wireless cellular communication technology including satellite/broadband wireless mobile communication, broadband terrestrial digital broadcasting technology such as DVB-T/T2/ATSC, GPS technology, and IEEE 1609 WAVE technology.

ITS architecture may further include a management layer and a security layer.

Figure 2:
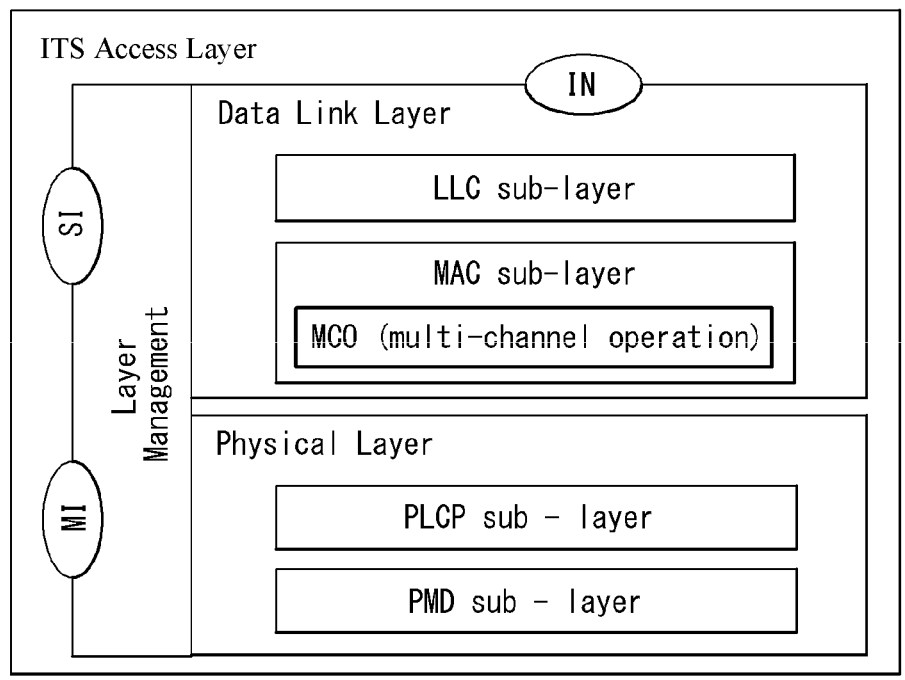
FIG. 2 illustrates an ITS access layer according to an embodiment of the present invention.

FIG. 2 illustrates an ITS access layer according to an embodiment of the present invention.

FIG. 2 illustrates in more detail the ITS Access Layer of the ITS system of FIG. 1. The access layer of FIG. 2 may include a data link layer, a physical layer, and layer management. The access layer of FIG. 2 has characteristics similar to or identical to an OSI 1 layer (physical layer) and an OSI 2 layer (data link layer).

The data link layer may include a Logical Link Control (LLC) sub-layer, a Medium Access Control (MAC) sub-layer, and a Multi-channel operation (MCO) sub-layer. The physical layer may include a Physical Layer Convergence Protocol (PLCP) sub-layer and a Physical Medium Access (PMD) sub-layer.

In order to enable a superordinate network layer to use a physical line between adjacent nodes (or between vehicles) having noise, the data link layer may convert the physical line into a communication channel having no transmission error. The data link layer performs a function of transmitting/transporting/transferring a 3-layer protocol, a framing function of dividing and grouping data to transmit into a packet (or frame) as a transmission unit, a flow control function of compensating a speed difference between the sending side and the receiving side, and a function of detecting and modifying or retransmitting a transmission error. Further, the data link layer performs a function of giving a sequence number to a packet and an ACK signal in order to avoid to erroneously confuse the packet or the ACK signal and a function of controlling setting, maintaining, short-circuit, and data transmission of a data link between network entities. Furthermore, such a data link layer may include a logical link control (LLC) sub-layer and a medium access control (MAC) sub-layer based on IEEE 802 standard.

A main function of the LLC sub-layer is to enable to use several different sub-MAC sub-layer protocols to allow communication unrelated to topology of a network.

The MAC sub-layer may control occurrence of collision/contention between vehicles when several vehicles (or nodes or a vehicle and peripheral devices) use a shared medium. The MAC sub-layer may format a packet transferred from a superordinate layer to correspond to a frame format of the physical network. The MAC sub-layer may perform addition and identification functions of a sender address/recipient address, carrier detection, collision detection, and fault detection on a physical medium.

The physical layer: the physical layer may define an interface between a node and a transmission medium to a lowest layer on an ITS layer structure and perform modulation, coding, and mapping of a transmission channel to a physical channel for bit transmission between data link layer entities. Further, the physical layer performs a function of notifying the MAC sub-layer whether a wireless medium is being used (busy or idle) through carrier sense and clear channel assessment (CCA). Furthermore, such a physical layer may include a physical layer convergence protocol (PLCP) sub-layer and a physical medium access (PMD) sub-layer based on IEEE standard.

The PLCP sub-layer performs a function of connecting a data frame with the MAC sub-layer. By attaching a header to the received data, the PLCP sub-layer enables to operate the MAC sub-layer regardless of physical characteristics. Therefore, in the PLCP frame, a format thereof may be defined differently according to various different wireless LAN physical layer standards.

A main function of the PMD sub-layer may perform carrier/RF modulation of frames received from the PLCP sub-layer and then transmit the frames to a wireless medium according to transmission and reception transmission related standards.

Layer management performs a function of managing and servicing information related to an operation and security of an access layer. Information and service are bilaterally transferred and shared through MI (interface between management entity and access layer or MI-SAP) and SI (interface between security entity and access layer or SI-SAP). Two-way information and service transfer between the access layer and a network/transport layer is performed by IN (or IN-SAP).

The MCO sub-layer may provide various services such as a safety service and other services, i.e., a non-safety service other than the safety service using a plurality of frequency channels. By effectively distributing a traffic load in a particular frequency channel to other channels, the MCO sub-layer may minimize collision/contention when communicating between vehicles in each frequency channel. The MCO sub-layer may perform multi-channel access and operation to be described hereinafter based on setting received from the superordinate layer.

Figure 3:
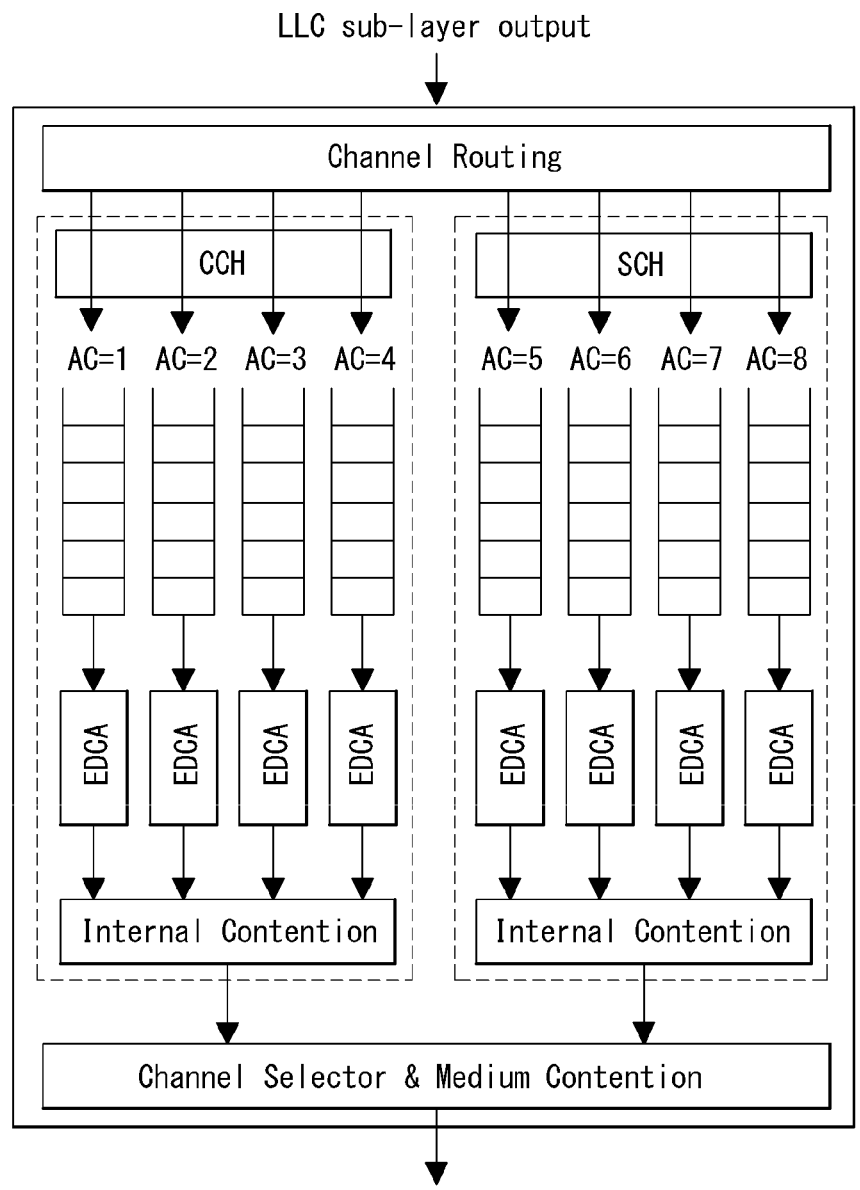
FIG. 3 illustrates a conceptual internal architecture of a MAC sub-layer that performs a multi-channel operation (MCO) according to an embodiment of the present invention.

FIG. 3 illustrates a conceptual internal architecture of a MAC sub-layer that performs a multi-channel operation (MCO) according to an embodiment of the present invention.

In an embodiment, the architecture of FIG. 3 may correspond to a MCO block of FIG. 2. An MCO structure of FIG. 3 may include channel coordination in which channel access is defined, channel routing that defines an operation process of a management frame and overall data between PHY-MAC layers, Enhanced Dedicated Channel Access (EDCA) that determines and defines a priority of a transmission frame, and a data buffer (or queue) that stores a frame received from a superordinate layer. A channel coordination block is not shown in FIG. 3, and channel coordination may be performed by an entire MAC sub-layer of FIG. 3.

Channel coordination: in an embodiment, channel access to the Control Channel (CCH) and the Service Channel (SCH) may be controlled. Channel access coordination will be described later. In an embodiment, a Wave Short Message (WSM) may be transmitted to the CCH (via), and the WSM and/or IP data may be transmitted to the SCH.

A data buffer (queue): The data buffer may store a data frame received from a superordinate layer according to a defined Access Category (AC). In the embodiment of FIG. 3, a data buffer may be provided for each AC.

Channel routing: the channel routing block may transfer data input from a superordinate layer to the data buffer. For a transmission request of the superordinate layer, a transmission operating parameter such as a channel number, transmission power, and a data rate for the above-described channel coordination and frame transmission may be called.

EDCA: The EDCA is a contention based medium access method of dividing traffic into four access categories (ACs) according to a type of traffic with a method of guaranteeing a QoS in an existing IEEE 802.11e MAC layer to give differentiated priorities to each category and allocating differentiated parameters for each AC to give more transmission opportunities to traffic of a high priority. For transmission of data including a priority, an EDCA block may specify 8 priorities of 0 to 7 and map data arriving at the MAC layer to four ACs according to the priority.

Figure 4:
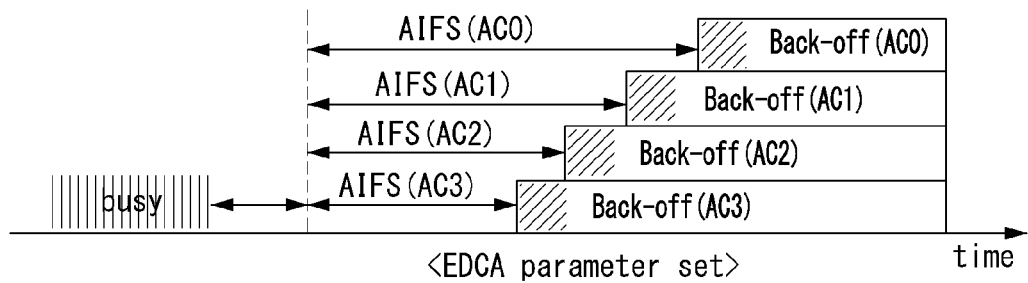
FIG. 4 illustrates the relationship between a user priority of EDCA (Enhanced Distributed Channel Access) and an Access Category (AC) according to an embodiment of the present invention.

FIG. 4 illustrates the relationship between a user priority of EDCA and an access category (AC) according to an embodiment of the present invention.

The relationship between a user priority of the EDCA and the AC is shown in FIG. 4. In FIG. 4, the higher the AC number, the higher the priority. All ACs have each transmission queue and AC parameter and a difference of priorities between ACs is determined based on differently set AC parameter values. The differently set AC parameter value is connected to back-off to have different channel access order. Each of parameter values of the corresponding AC uses AIFS[AC], CWmin[AC], and CWmax[AC], and here, an Arbitration Inter-Frame Space (AIFS) is a minimum time for determining whether a channel is idle before transmission. When AIFS[AC] and CWmin[AC] have a small value, AIFS[AC] and CWmin[AC] have a high priority and thus channel access delay is shortened and more bands may be thus used in a given traffic environment.

When a collision between stations occurs while transmitting a frame, a transmitter generates a new back-off counter. Transmission queue for four ACs defined to IEEE 802.11 MAC individually contends for wireless medium access within a single station, as shown in FIG. 4. Because each AC has an independent back-off counter, a virtual collision may occur. When there are two or more ACs in which back-off is simultaneously completed, data of an AC having a highest priority are first transmitted, and other ACs increase a CW value to again update the back-off counter. Such a collision solving process is referred to as a virtual collision process. Further, when transmitting data through the transmission opportunity (TXOP), EDCA enables access to the channel. Because one frame is too long, when one frame cannot be transmitted for TXOP of one time, the one frame may be divided into smaller frames and be transmitted.

Figure 5:
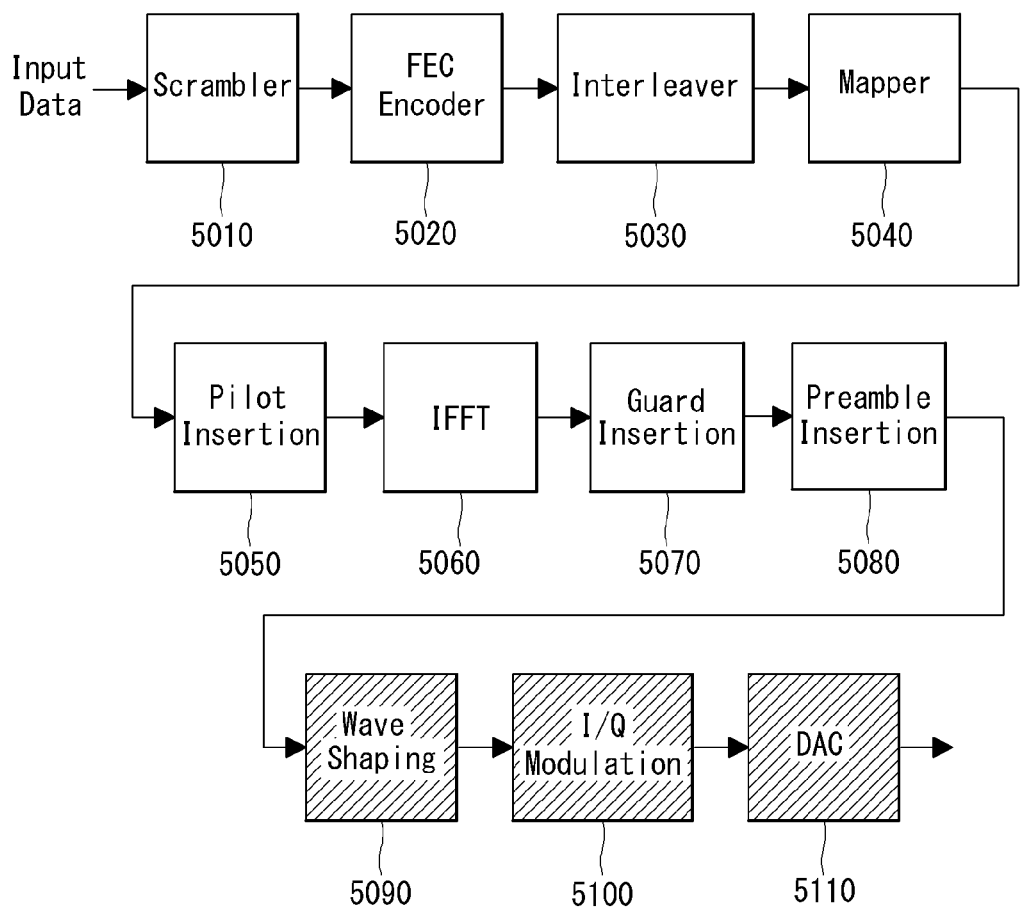
FIG. 5 illustrates a physical layer configuration of a V2X transmission device according to an embodiment of the present invention.

FIG. 5 illustrates a physical layer configuration of a V2X transmission device according to an embodiment of the present invention.

In an embodiment, FIG. 5 illustrates a physical layer signal processing block of IEEE 802.11 or ITS-G5. However, FIG. 5 illustrates a physical layer configuration according to an embodiment of the present invention and is not limited only to the above-described transmission standard technology.

A physical layer processor of FIG. 5 may include a Physical layer Convergence Protocol (PLCP) sub-layer baseband signal processing part including at least one of a scrambler 5010, an FEC encoder 5020, an interleaver 5030, a mapper 5040, a pilot insertion 5050, an IFFT 5060, a guard insertion 5070, and a preamble insertion 5080 and a physical medium dependent (PMD) sub-layer RF band signal processing part including at least one of a wave shaping 5090, an I/Q modulation 5100, and a DAC 5110. A function description of each block is as follows.

The scrambler 5010 may perform an XOR operation of input bit stream with a pseudo random binary sequence (PRBS) to randomize the input bit stream. In order for the receiving side to correct an error on a transmission channel, the FEC encoder 5020 may add redundancy to transmission data. The interleaver 5030 may interleave an input data/bit string based on an interleaving rule in order to respond to a burst error. In an embodiment, when deep fading or erasure is applied to a QAM symbol, interleaved bits are mapped to each QAM symbol and thus an error may be prevented from occurring in continued bits of entire codeword bits. The mapper 5040 may allocate an input bit word to single constellation. The pilot insertion 5050 inserts a reference signal into a predetermined position of a signal block. By using such a reference signal, the receiver may estimate a channel distortion phenomenon such as channel estimation, frequency offset, and timing offset.

In order to enhance transmission efficiency and flexibility in consideration of characteristics of the transmission channel and a system structure, the IFFT 5060, i.e., an inverse waveform transform block may convert an input signal. In an embodiment, in the case of an OFDM system, the IFFT 5060 may convert a signal of a frequency domain to a signal of a time domain using an inverse FFT operation. The IFFT 5060 may not be used or may be omitted in the case of a single carrier system. In order to minimize an influence of delay spread of the transmission channel, the guard insertion 5070 may insert a guard interval between adjacent signal blocks. In an embodiment, in the case of an OFDM system, the guard insertion 5070 may insert a click prefix into a guard interval segment. The preamble insertion 5080 may insert a predetermined type signal, i.e., a preamble into a transmission signal for a transmission and reception period so that the receiver may quickly and efficiently detect a target signal. In an embodiment, in the case of an OFDM system, the preamble insertion 5080 may define a signal block/signal frame including a plurality of OFDM symbols and insert a preamble symbol into a start portion of the signal block/signal frame.

The wave shaping 5090 may perform waveform processing of an input baseband signal based on channel transmission characteristics. In an embodiment, in order to obtain a reference of out-of-band emission of the transmission signal, the waveform shaping 5090 may perform square-root-raised cosine (SRRC) filtering. In the case of a multi-carrier system, the waveform shaping 5090 may not be used or may be omitted. The I/Q modulation 5100 may perform in-phase and quadrature modulation. The Digital to Analog Converter (DAC) 5110 may convert and output an input digital signal to an analog signal. An output analog signal may be transmitted through an output antenna.

Each of the blocks illustrated and described in FIG. 5 may be omitted or replaced by another block having similar or identical functions. The blocks of FIG. 5 may be configured with a combination of some of or all the blocks, if necessary.

Figure 6:
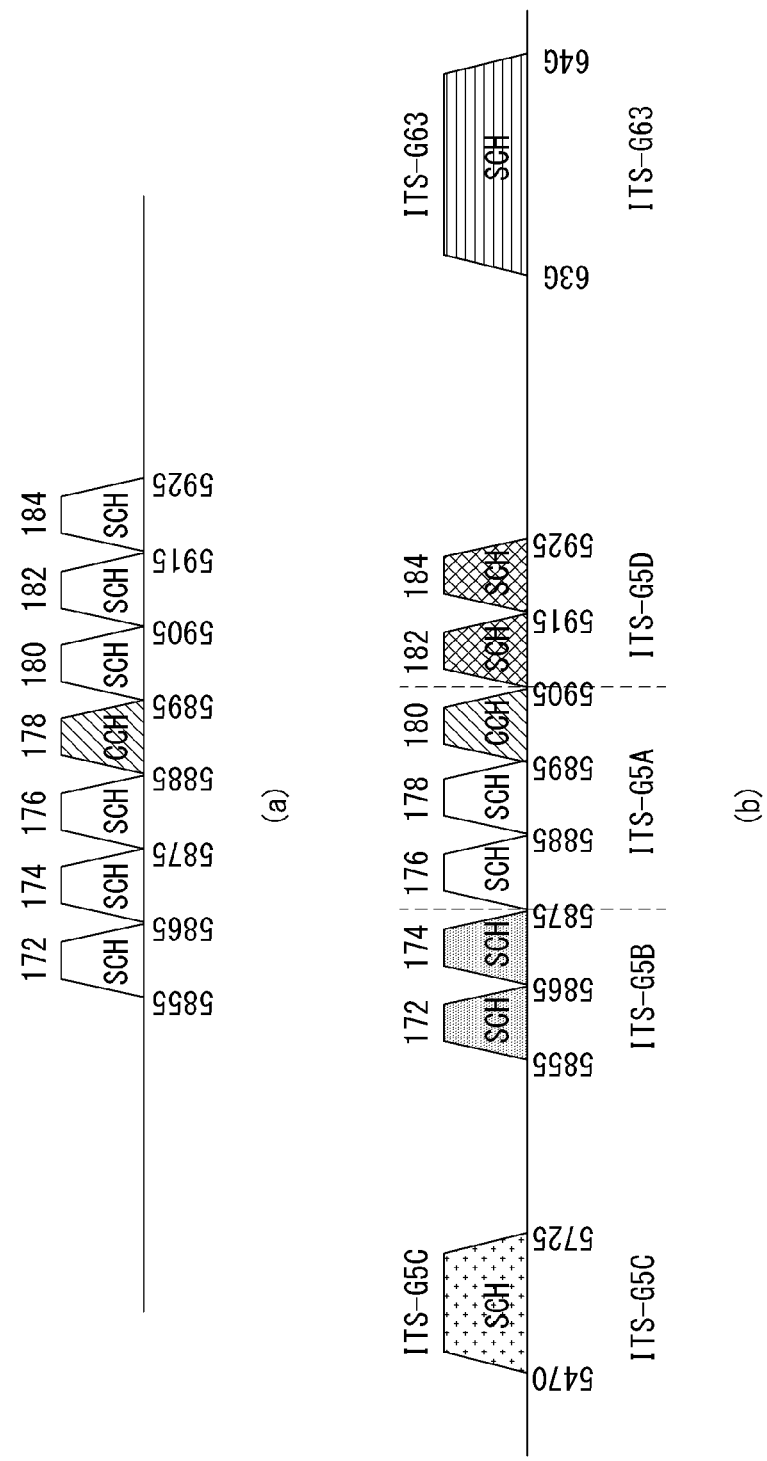
FIG. 6 illustrates multi-channel allocation used for an ITS system operation according to an embodiment of the present invention.

FIG. 6 illustrates multi-channel allocation used for an ITS system operation according to an embodiment of the present invention.

FIG. 6(*a*) illustrates US spectrum allocation for an ITS, and FIG. 6(*b*) illustrates EP spectrum allocation for an ITS.

As shown in FIG. 6, the United States and Europe have seven frequencies (each frequency bandwidth: 10 MHz) in 5.9 GHz band (5.855 to 5.925 GHz). Seven frequencies may include one CCH and 6 SCHs. As shown in FIG. 6(*a*), in the United States, the CCH is allocated to a channel number 178 and as shown in FIG. 6(*b*), in European, the CCH is allocated to a channel number 180.

In Europe, in order to provide a service that is time-sensitive and having a large data capacity, it is considered to additionally use an ITS-G63 band in a superordinate frequency band based on 5.9 GHz and it is considered to use an ITS-G5 band in a subordinate frequency band. In order to provide a high quality of service by appropriately allocating the service to various multi-channels in such an environment, development of an efficient multi-channel operation method is required.

The CCH indicates a radio channel used for exchange of a management frame and/or a WAVE message. The WAVE message may be a WAVE short message (WSM). The SCH is a radio channel used for providing a service and represents a random channel instead of the CCH. In an embodiment, the CCH may be used for communication of a Wave Short Message Protocol (WSMP) message or communication of a system management message such as a WAVE Service Advertisement (WSA). The SCH may be used for general-purpose application data communication, and communication of such general-purpose application data may be coordinated by service related information such as the WSA.

Hereinafter, the WSA may be also referred to as service advertisement information. The WSA is an application may provide information including announcement of availability of an application-service. A WSA message may identify and describe an application service and a channel in which the service is accessible. In an embodiment, the WSA may include a header, service information, channel information, and WAVE routing advertisement information.

Service advertisement information for service access may be a periodic message. In an embodiment, Co-operative Awareness Messages (CAM) may be periodic messages. The CAM may be broadcasted periodically by a facilities layer. In an embodiment, the CAM may also be transmitted by the RSU, and in such a case, the CAM may be transmitted and received in an RSU interval hereinafter.

Decentralized Environmental Notification Messages (DENM) may be event messages. The event message may be triggered by detection of the event to be transmitted. Service messages may be transmitted to manage a session. In the following embodiments, the event message may include a security message/information. The service message may include a non-safety message/information.

Figure 7:
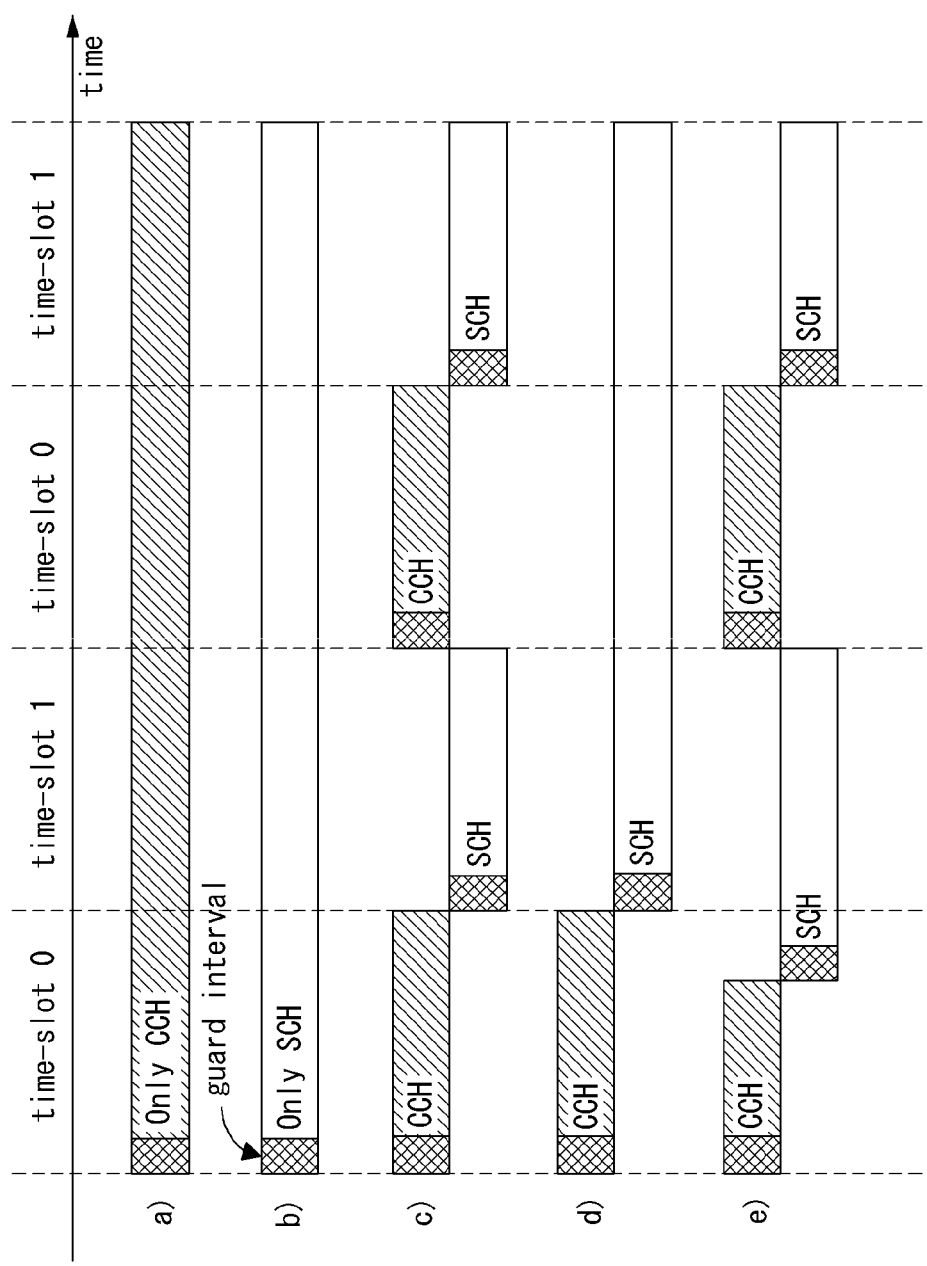
FIG. 7 illustrates a channel coordination mode of a multi-channel operation according to an embodiment of the present invention.

FIG. 7 shows a channel coordination mode of a multi-channel operation according to an embodiment of the present invention.

FIG. 7 shows (a) a continuous mode, (b) an altering mode, (c) an extended mode, and (d) an immediate mode, that is, channel coordination modes of a multi-channel operation. The channel coordination mode may indicate a method that a V2X device accesses a CCH and an SCH.

A V2X device may access at least one channel. In an embodiment, a single-radio device may monitor a CCH and exchange data via an SCH. For this purpose, a channel interval needs to be specified. FIG. 7 shows such a channel interval, that is, time slot allocation. Radio channel altering may be performed based on a synchronized interval in association with a common time base. The sync interval may include a plurality of time slots. Furthermore, the plurality of time slots may correspond to a CCH interval and an SCH interval. In such a case, the sync interval may include a CCH interval and an SCH interval. Traffic may be exchanged in a CCH during the CCH interval. A single-radio device participating in application-service may switch to an SCH during an SCH interval. Each of the CCH interval and the SCH interval may include a guard interval. Each interval may start with a guard interval.

In an embodiment, the exchange of multi-channel operation information and safety-related services information may be performed in a CCH during a CCH interval. Furthermore, negotiation for information exchange between a service provider and a user may be performed in a CCH during a CCH interval. A hardware timing operation for the channel altering of a V2X device may be initiated by a sync signal obtained through universal time coordinated (UTC) estimation. A channel sync may be performed every 1 pulse per second (PPS) section based on UTC.

In an embodiment, FIG. 7 is a channel coordination method of a multi-channel operation (MCO) described in IEEE 1609.4, and shows a method in which in a single physical layer, two MAC layers divide time and alternately use a CCH and different channel modes.

(a)&(b) continuous mode: the continuous mode is a mode in which each vehicle or all vehicles operate regardless of a time division basis, such as the time slot/CCH interval/SCH interval of FIG. 6. In the continuous mode, a V2X device may continuously receive operation information and safety-related services information of a multi-channel in a designated CCH or SCH, or an information exchange may be performed between a service provider and a user.

(c) altering mode: in the altering mode, each vehicle or all vehicles may receive operation information and safety-related services/information of a multi-channel during a CCH interval or may perform a negotiation process for an information exchange between a service provider/user. In the altering mode, each vehicle or all vehicles perform a service/information exchange between a service provider and a user during an SCH interval. In the altering mode, V2X devices may alternately perform communication through a CCH and an SCH during a configured CCH interval and SCH interval.

(d) extended mode: in the extended mode, communication during a CCH interval and an SCH interval may be performed as in the altering mode. However, a service/information exchange during an SCH interval may also be performed in a CCH interval. In an embodiment, a V2X device in the extended mode may transmit and receive control information during a CCH interval, and may maintain an SCH interval until the exchange of service/information is terminated when it enters the SCH interval.

(e) immediate mode: in the immediate mode, the communication of a V2X device may be performed as in the altering mode and/or the extended mode. However, a V2X device in the immediate mode may immediate change a channel to a designated SCH without waiting for the end of a CCH interval when negotiation for an information exchange is completed during the CCH interval, and may initiate an information exchange. As shown in FIG. 7, the extended mode and the immediate mode may be used together.

In the case of the channel coordination modes shown in FIG. 7, management information of a multi-channel and information exchange and negotiation for service provision may be performed only in a CCH during a CCH interval. Negotiation for receiving safety-related services and information or for an information exchange between a service provider and a user may also be performed only in a CCH during a CCH interval.

A guard interval may be included between a CCH interval and an SCH interval. The guard interval may enable a communication device to secure the time necessary for sync upon performing frequency altering and channel altering. Upon channel altering, a hardware timer operation may be started by a sync signal obtained through universal time coordinated (UTC) estimation. A channel sync may be synchronized every 1 pulse per second (PPS) section using UTC as a reference signal.

In an embodiment, a sync interval may include a CCH interval and an SCH interval. That is, one sync interval may include two time slots. The CCH interval and the SCH interval may correspond to a time slot 0 and a time slot 1, respectively. The start of a sync interval may be identical with the start of a common time reference second. A sync interval that is a positive number times may be included for 1 second.

Hereinafter, an enhanced mode, that is, a new channel coordination mode for an efficient multi-channel operation, is proposed and described.

Figure 8:
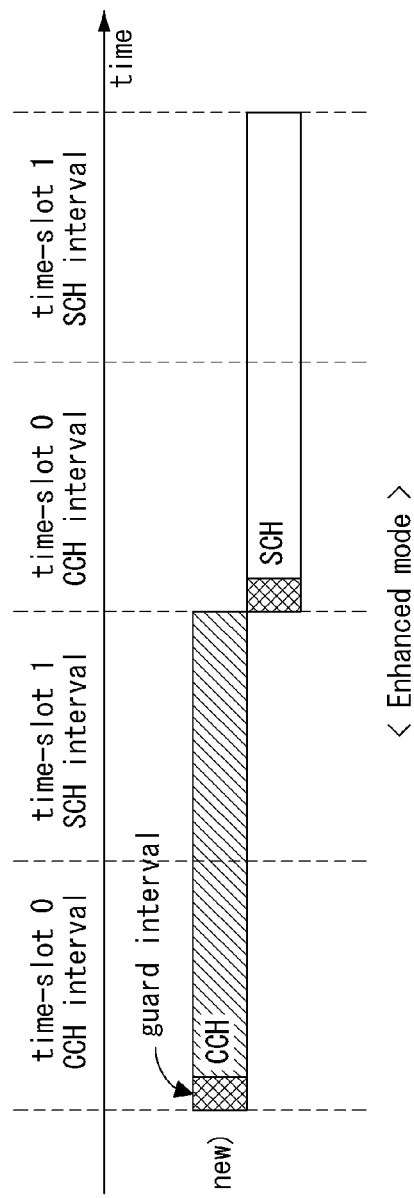
FIG. 8 shows an enhanced mode, that is, a channel coordination mode for a multi-channel operation according to an embodiment of the present invention.

FIG. 8 shows an enhanced mode, that is, a channel coordination mode for a multi-channel operation according to an embodiment of the present invention.

FIG. 8 shows a channel coordination mode proposed in the present invention. In this specification, the proposed channel coordination mode is called an enhanced mode. In the enhanced mode, a V2X communication device may exchange control signals via a CCH in an SCH interval in addition to a CCH interval. That is, the V2X communication device may perform CCH access/communication and SCH access/communication in a sync interval unit.

In an embodiment, operation information and safety-related services of a multi-channel may be transmitted and received via a CCH during a CCH interval as in the modes of IEEE 1609.4. In addition, in the enhanced mode, related information and service may be transmitted and received via the CCH during an SCH interval. A control signal exchange for an information exchange between a service provider and a user may also be transmitted and received via a CCH during a CCH interval as in the modes of IEEE 1609.4. In addition, in the enhanced mode, the control signal exchange may also be transmitted and received via the CCH during an SCH interval.

A control signal includes operation information and safety-related services information of a multi-channel. Furthermore, a control signal includes a signal for an information exchange between a service provider and a user. In an embodiment, a control signal may include a service advertising message (SAM) transmitted by a provider and an ACK message on the receiver side corresponding to the SAM. Furthermore, a control signal may include a WAVE service advertising message (WSAM) provided by a provider and an ACK message on the receiver side corresponding to the WSAM. Furthermore, a control signal may include a Request-To-Send (RTS) signal and Clear-To-Send (CTS) signal for a negotiation between nodes. The nodes may correspond to terminals or vehicles.

In the case of the enhanced mode, both a first time slot and a second time slot included in a sync interval may be used as a CCH interval, and at least one time slot included in a subsequent sync interval may be used as an SCH interval. That is, in the case of the enhanced mode, both the first time slot and second time slot of a sync interval may be referred to as a CCH interval.

In the enhanced mode, a control signal exchange that was permitted only in the CCH interval of a CCH is also permitted in an SCH interval, thereby being capable of improving the flexibility of a channel coordination mode operation. Particularly, there is an advantage in that a vehicle safety-related service provision section can be operated longer compared to the existing mode operation. A detailed operation method and embodiment for the enhanced mode are additionally described below.

Figure 9:
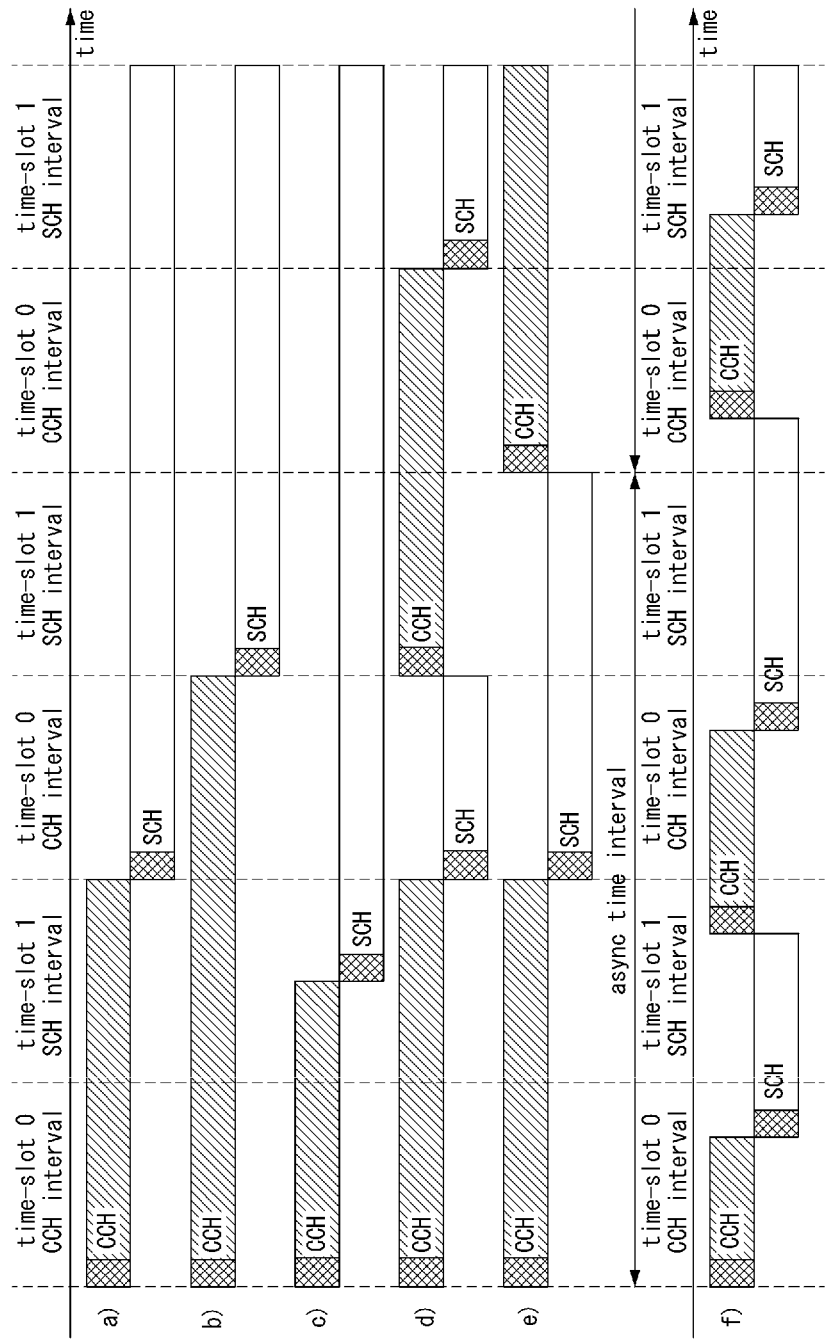
FIG. 9 shows a channel coordination mode of a channel operation method based on the enhanced mode according to an embodiment of the present invention.

FIG. 9 shows a channel coordination mode of a channel operation method based on the enhanced mode according to an embodiment of the present invention.

In the embodiment of FIG. 9(a), a V2X device may transmit and receive safety-related services or control signals via a CCH during a CCH interval and an SCH interval. Furthermore, the V2X device may move to a designated SCH in a next interval, and may perform an information exchange between a service provider and a user. In this case, the safety-related services provision via the CCH in the CCH interval and the SCH interval and the control signal exchange for an information exchange between the service provider and the user may be managed using the following method.

If there are service needs or request regardless of a CCH interval/SCH interval, a V2X device may move to a CCH and transmit and receive safety-related services or control signals. Alternatively, the V2X device may separately perform communication in the CCH interval and the SCH interval and. That is, the V2X device may perform communication for safety-related services in the CCH interval, and may perform communication for a control signal exchange for service provision in the SCH interval. Furthermore, the V2X device separately performs communication in the CCH interval and the SCH interval, but may perform communication regardless of the interval with respect to emergency services.

In the embodiment of FIG. 9(b), a basic operation of a communication mode is the same as the embodiment of FIG. 9(a). However, in the embodiment of FIG. 9(b), service transmission and reception may be performed via an SCH in an SCH interval. That is, a service information exchange between a service provider and a user may be started in the SCH interval. If vehicle safety-related services provision and reception are important, although a control signal exchange has been completed in a previous SCH interval, a service information exchange may be started in an SCH interval after a CCH interval.

In the embodiment of FIG. 9(c), a basic operation of a communication mode is the same as the embodiments of FIGS. 9(a) and 9(b). However, in the embodiment of FIG. 9(c), when a control signal exchange is completed, a V2X device may start service information transmission and reception by directly accessing a designated SCH channel without waiting for the end of a corresponding interval, as in the embodiments of FIGS. 9(a) and 9(b).

In the embodiments of FIGS. 9(d) and 9(e), a V2X device may exchange safety-related services or control signals via a CCH during a CCH interval and an SCH interval, and may transmit and receive services by accessing a designated SCH during a next predetermined interval (e.g., SCH interval or CCH interval+SCH interval). The embodiments of FIGS. 9(d) and 9(e) include alternately accessing an SCH and a CCH based on a predetermined interval, and area similar to the altering mode of FIG. 7(c).

The embodiment of FIG. 9(f) shows an asynchronous multi-channel operation method based on the enhanced mode. In the embodiment of FIG. 9(f), a V2X device may perform communication by accessing a CCH/SCH regardless of a CCH interval/SCH interval during an async time interval configured as an asynchronous multi-channel mode. In the embodiment of FIG. 9(f), a V2X device can access a required channel without taking into consideration a time-slot boundary, and thus has the highest degree of freedom in a multi-channel operation among the embodiments of FIG. 9.

In the embodiment of FIG. 9(f), a V2X device may transmit and receive multi-channel operation information/safety-related services by accessing a CCH regardless of a CCH interval/SCH interval. Furthermore, when a control signal exchange for a service information exchange between a service provider and a user is completed, the V2X device may start the service information exchange by directly accessing a designated SCH. An async time interval may be configured to operate based on a common reference time. The async time interval may be set as a specific value or may be used without constraint (indefinitely). The async time interval may be pre-set as a specific value indicating that a specific time value or period has not been determined.

In what follows, an efficient multi-channel operation method that uses two transceivers will be described.

Figure 10:
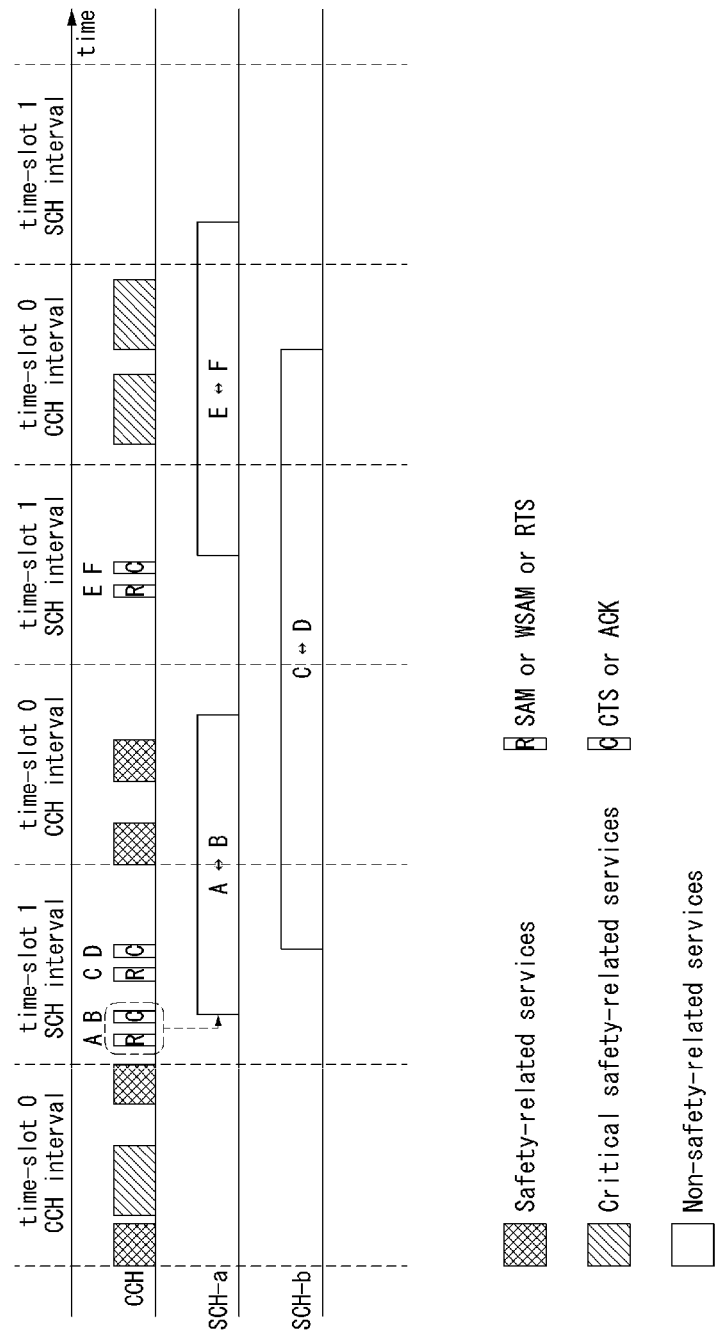
FIG. 10 illustrates architecture of a V2X communication device according to an embodiment of the present invention.

FIG. 10 illustrates architecture of a V2X communication device according to an embodiment of the present invention.

The V2X communication device of FIG. 10 includes two transceivers.

In the embodiment of FIG. 10, two transceivers may operate in the frequency bands showing similar frequency characteristics (frequency bands of 5.4 GHz/5.9 GHz). The two transceivers may be controlled by one multi-channel operation method. The two transceivers may also be controlled by one MAC layer. Access to the two transceivers may also be controlled by one MCO as described above.

The two transceivers may be used for CCH communication and SCH communication, respectively. In other words, one transceiver (transceiver-1) may be used for exchanging multi-channel operation information and safety-related service/information or exchanging control signals for exchange of information between a service provider and a user. And when exchange of control signals is completed in the CCH, the other transceiver (transceiver-2) may be used for providing a service at an indicated SCH and exchanging information/data between users. In FIG. 10 and in the embodiment related to FIG. 10, a transceiver for CCH communication may be referred to as a first transceiver while a transceiver for SCH communication may be referred to as a second transceiver. In particular, in the case of CCH communication, embodiments of FIGS. 8 to 9 may be applied to the operation of the first transceiver.

In what follows, a method for operating a V2X communication device of FIG. 10 will be described. CCH access of the first transceiver may be operated similarly to the CCH access of a single transceiver. A service/signal such as service advertisement message (SAM), control signal, WAVE service advertisement message (WSAM), or RTS/CTS may be exchanged through a first transceiver during a CCH interval in the CCH.

As described above, exchange of multi-channel operation information and safety-related service/information and exchange of control signals for exchanging information between a service provider and a user may be performed by using at least one of the CCH interval or SCH interval in the CCH. The operation of the first transceiver for CCH access is described as follows.

(1) The first transceiver of the V2X communication device may transmit and receive multi-channel operation information, safety-related service/information, and control signals for exchanging information between a service provider and a user during a CCH interval through the CCH.

(2) The first transceiver of the V2X communication device may transmit and receive the multi-channel operation information and safety-related service/information during the CCH interval through the CCH while transmitting and receiving the control signals for exchanging information between a service provider and a user during an SCH interval through the CCH. In the enhanced mode embodiment as shown in FIGS. 8 to 9, the first transceiver may perform communication in the CCH not only during the CCH interval but also during the SCH interval.

(3) The first transceiver of the V2X communication device may operate based on the method (2) but perform transmission and reception during the SCH interval of the CCH exceptionally for an emergency safety service. For example, decentralized environment notification message (DEMN) may be delivered with high priority during the SCH interval.

4) The methods (2) and (3) are based on synchronous multi-channel operation. However, in the case of method (4), safety-related service/information and control signals may be delivered without a time boundary limitation such as the CCH interval/SCH interval. In other words, the method (4) may be performed based on asynchronous multi-channel operation. For example, multi-channel operation information and safety-related service/information may be provided not only during the CCH interval but also during the SCH interval. Similarly, non-safety related service/information may be provided not only during the SCH interval of the CCH but also during the CCH interval.

When exchange of control signals for exchanging information between a service provider and a user is completed in the CCH, the second transceiver operating in the SCH may access a designated SCH and perform exchange of information between the service provider and the user.

The V2X device of FIG. 10 provides an advantage that multi-channel operation information and safety-related service/information may always be obtained by using a transceiver dedicated to the CCH. The V2X device of FIG. 10 may increase the channel utilization ratio and throughput. The V2X device of FIG. 10 may reduce congestion of a specific channel by solving the hidden vehicle (node) problem.

Figure 11:
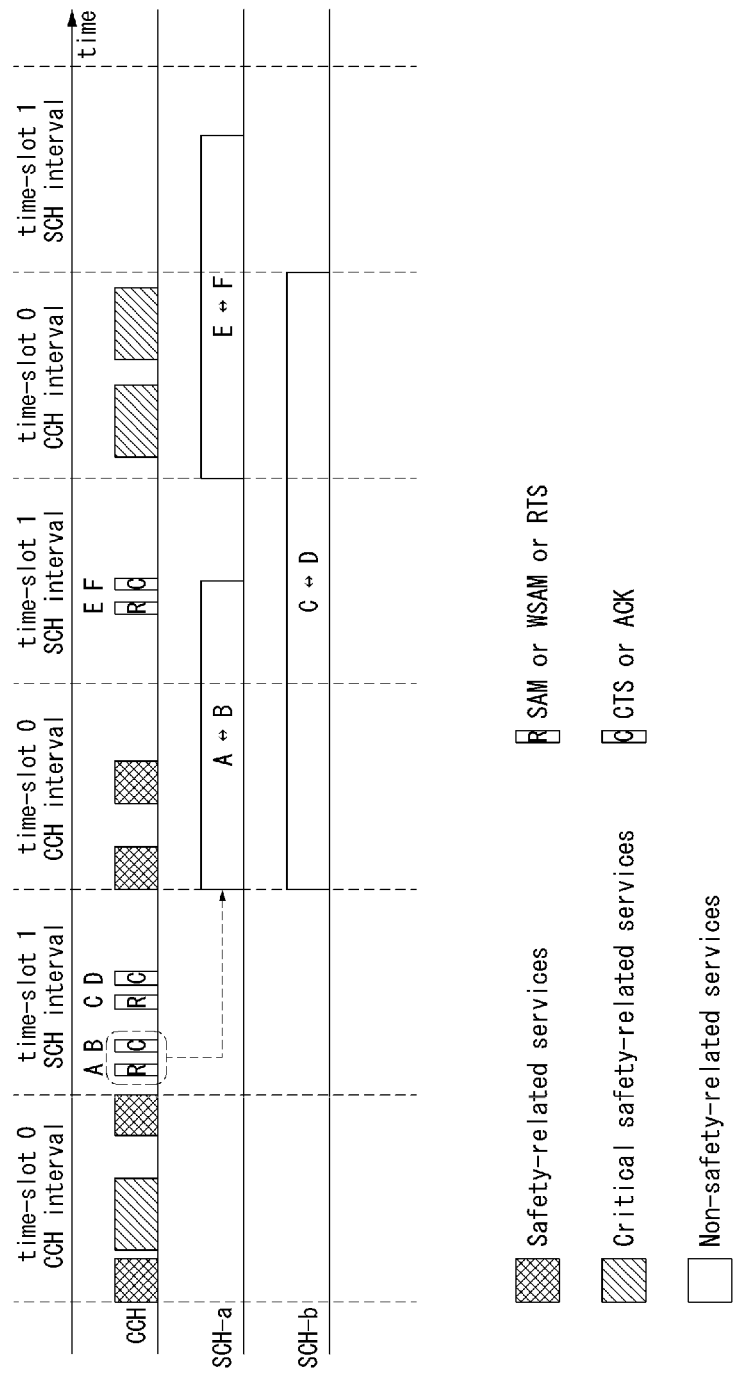
FIG. 11 illustrates a method for disposing time intervals according to an embodiment of the present invention.

FIG. 11 illustrates a method for disposing time intervals according to an embodiment of the present invention.

FIG. 11 illustrates a method for disposing time intervals for providing services more efficiently by using a transceiver dedicated to the CCH of the V2X device of FIG. 10. The first transceiver dedicated to the CCH may communicate based on the intervals shown in FIG. 11.

In FIG. 11, a method for disposing time intervals may be operated based on the channel coordination mode described with reference to FIG. 7. The multi-channel operation information, safety-related service/information, and control signals for exchanging information between a service provider and a user may be transmitted or received during the CCH interval. However, time intervals may also be disposed based on the enhanced mode described with reference to FIGS. 8 to 9 in addition to the embodiment of FIG. 11. In what follows, the embodiments (a) to (c) of FIG. 11 will be described.

FIG. 11(a): The multi-channel operation information and safety-related service/information may be transmitted and received during the CCH interval of the CCH. Non-safety signals/services such as control signals for exchanging information between a service provider and a user may be performed during the SCH interval of the CCH.

FIG. 11(b): Emergency safety services may be provided based on the method (a) within the SCH interval of the CCH. In other words, although basic safety services are provided during the CCH interval of the CCH, emergency safety services may also be provided during the SCH interval of the CCH.

FIG. 11(c): Based on the method (a), control signals preceding safety-related services, provision of which has to be completed within a limited time period, may be transmitted at the very beginning of the non-safety interval. In other words, a time-sensitive non-safety interval may be allocated at the very beginning of the SCH interval for exchange of control signals for time-sensitive non-safety services among control signals preceding provision of services.

Based on the asynchronous multi-channel operation, non-safety signals/services may be provided without distinguishing the CCH interval and SCH interval of the CCH from each other. As an embodiment, multi-channel operation information and safety-related service/information may be provided or received not only during the SCH interval as well as the CCH interval of the CCH. Non-safety signals/services such as control signals for exchanging information between a service provider and a user may be provided or received not only during the CCH interval as well as the SCH interval of the CCH.

Figure 12:
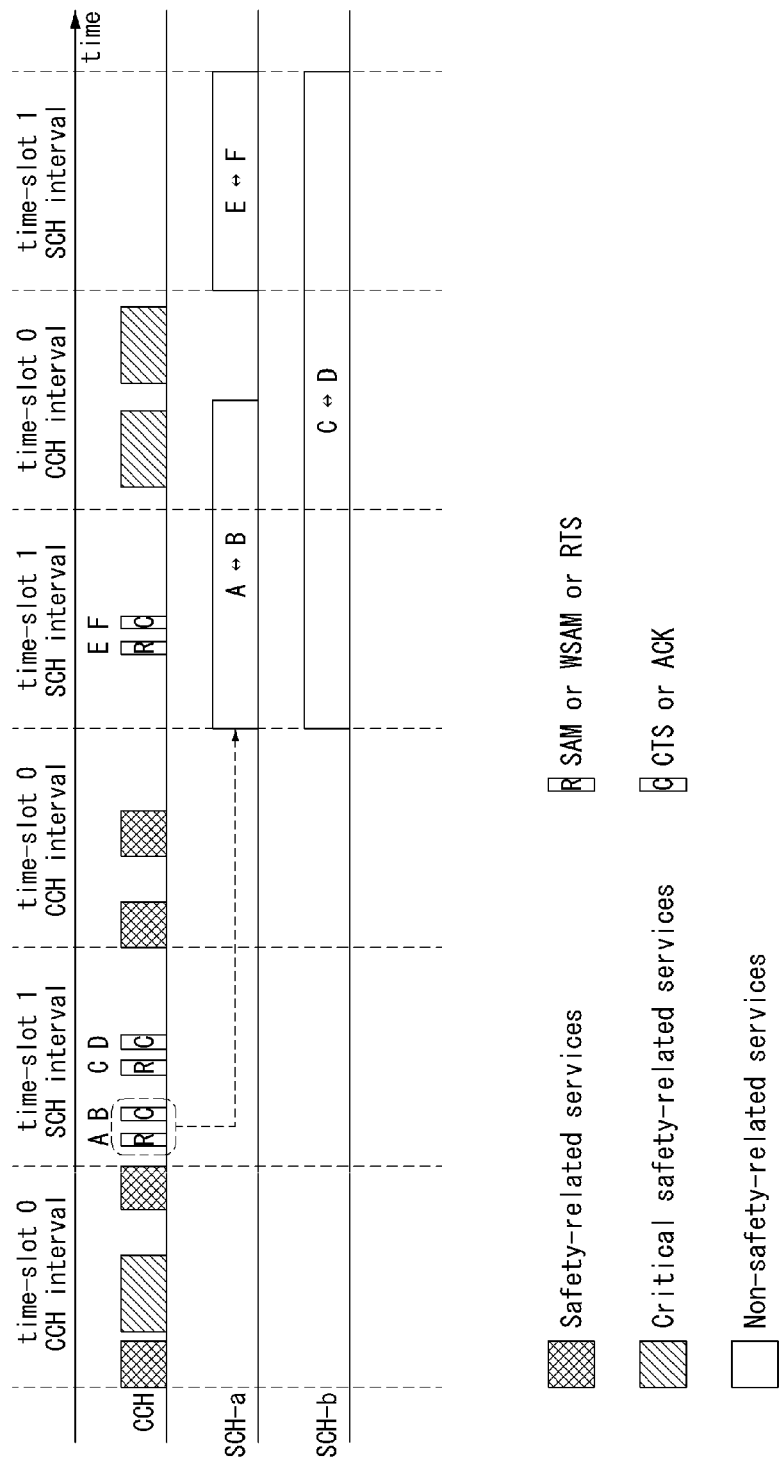
FIG. 12 illustrates a data communication method of a V2X communication device including a dual transceiver according to one embodiment of the present invention.

FIG. 12 illustrates a data communication method of a V2X communication device including a dual transceiver according to one embodiment of the present invention.

As described above, the first transceiver may perform communication through the CCH while the second transceiver performs communication through the SCH.

As shown in FIG. 12, safety-related services and critical safety-related services may be transmitted and received through the CCH during the CCH interval. The safety-related services may be periodic, safety-related services. And control signals for providing services may be transmitted and received through the CCH during the SCH interval.

The maximum number of allowable control signals in the CCH during the SCH interval may be determined based on the number of SCHs. The maximum number of allowable channels in each SCH interval may be the number of idle channels in the SCH interval window. If all of the control signals are reserved according to the number of SCH channels during the SCH interval or the number of idle channels, further exchange of control signals may not be performed. Or those control signals completed for communication may be invalidated.

In the embodiment of FIG. 12, when exchange of control signals through the CCH is completed during the SCH interval, the V2X device may immediately access the designated SCH and perform exchange of information. For example, after completing exchange of control signals in the SCH interval, vehicle A and vehicle B may immediately exchange service information by accessing the SCH-a channel. Also, after exchange of control signals between the vehicles A and B during the SCH interval, vehicle C and vehicle D may complete exchange of control signals and exchange service information by immediately accessing the SCH-b channel. Vehicles may perform exchange of control signals in the SCH interval by using the transceiver for CCH communication (the first transceiver) and exchange service information by accessing a specific SCH by using a transceiver for SCH communication (the second transceiver).

When exchange of service information between vehicles is completed in each SCH, the V2X device at the user side may transmit an ACK signal to indicate that the service has been completed. Or, transmission of the ACK signal may be omitted to prevent congestion due to exchange of information.

Figure 13:
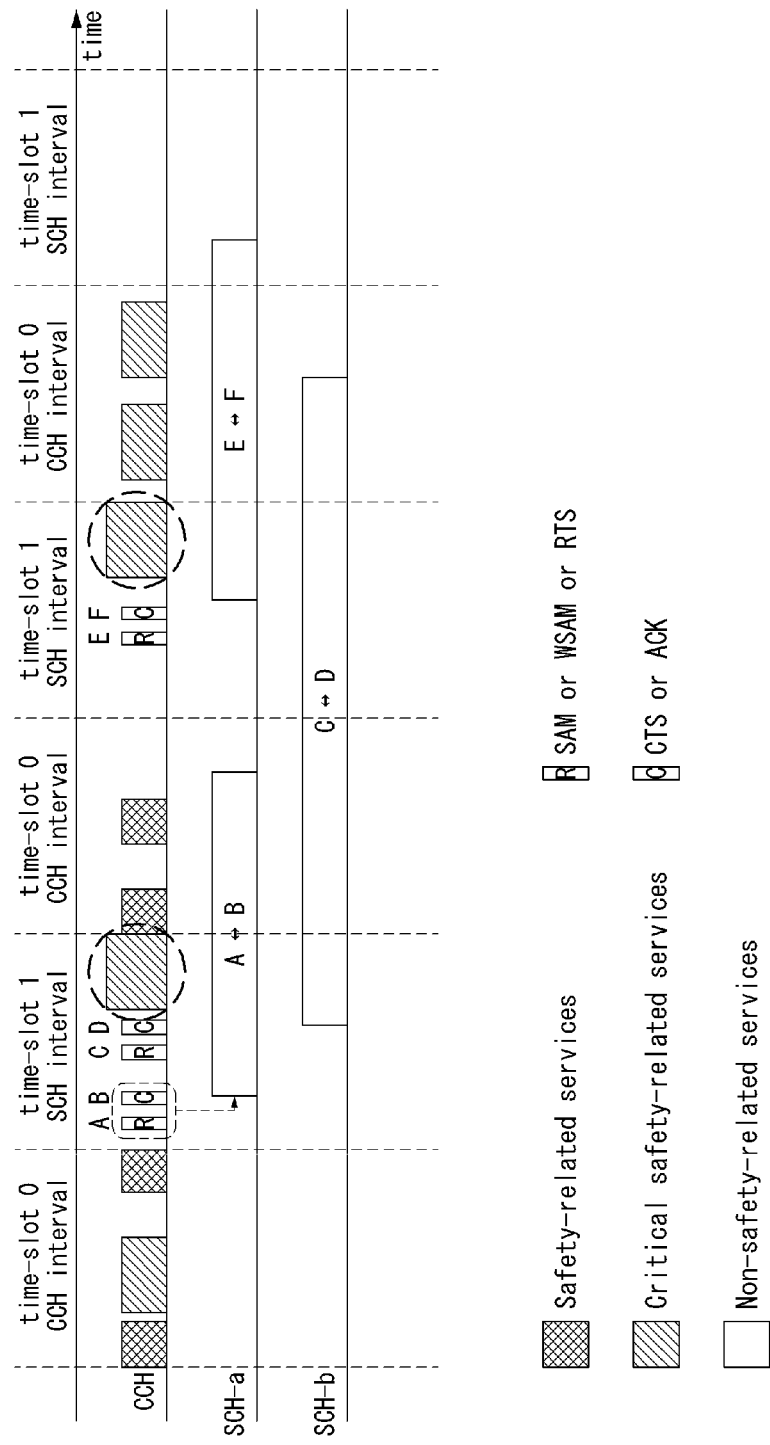
FIG. 13 illustrates a data communication method of a V2X communication device including a dual transceiver according to one embodiment of the present invention.

FIG. 13 illustrates a data communication method of a V2X communication device including a dual transceiver according to one embodiment of the present invention.

As described above, the first transceiver may perform communication through the CCH while the second transceiver performs communication through the SCH.

FIG. 13 illustrates a different operation scenario based on the method (3) of the enhanced mode. Although repeated descriptions of FIG. 12 are omitted in the descriptions of FIG. 13, the omitted descriptions may still be applied to the embodiment of FIG. 13.

In the embodiment of FIG. 13, when exchange of control signals through the CCH is completed during the SCH interval, the V2X device may immediately access the designated SCH and perform exchange of information. For example, after completing exchange of control signals in the SCH interval, vehicle A and vehicle B may immediately exchange service information by accessing the SCH-a channel. Also, after exchange of control signals between the vehicles A and B during the SCH interval, vehicle C and vehicle D may complete exchange of control signals and exchange service information by immediately accessing the SCH-b channel.

However, in the embodiment of FIG. 13, emergency safety services, namely critical safety-related services may be provided in the SCH interval as well as in the CCH interval. The embodiment of FIG. 13 may also be applied to the embodiments of FIGS. 11 and 12. In the embodiment of FIG. 13, the second time slot within the sync interval may include a critical safety interval for communicating critical safety-related services. The critical safety interval is an interval for performing communication related to safety services with high priority.

Figure 14:
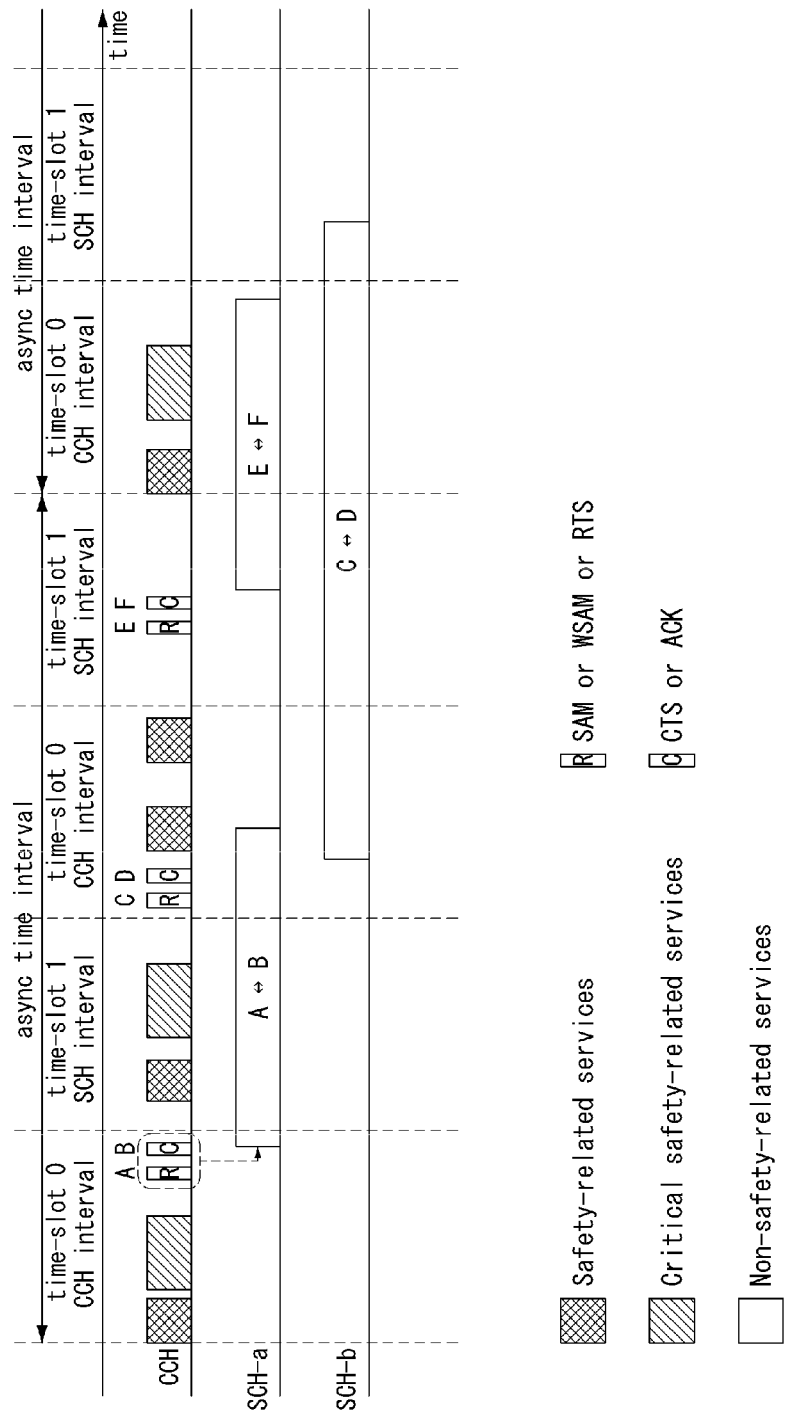
FIG. 14 illustrates a data communication method of a V2X communication device including a dual transceiver according to one embodiment of the present invention.

FIG. 14 illustrates a data communication method of a V2X communication device including a dual transceiver according to one embodiment of the present invention.

As described above, the first transceiver may perform communication through the CCH while the second transceiver performs communication through the SCH.

FIG. 14 illustrates an operation scenario based on the method (3) of the enhanced mode. Although repeated descriptions of FIG. 12 are omitted in the descriptions of FIG. 14, the omitted descriptions may still be applied to the embodiment of FIG. 14.

FIG. 14 illustrates an embodiment where an asynchronous time interval is configured to have a predetermined period. In other words, the asynchronous time interval of FIG. 14 may include two synchronous intervals, namely four time slots. In the asynchronous time interval, control signals may be exchanged through the CCH during the CCH interval or SCH interval, and when exchange of control signals is completed, the V2X device may immediately access the designated SCH and perform exchange of service information. The start of the asynchronous time interval may be aligned with the start timing of a common time reference.

In the embodiment of FIG. 14, when exchange of control signals through the CCH is completed during the CCH interval, the V2X device may immediately access the designated SCH and perform exchange of information. For example, after completing exchange of control signals in the CCH interval, vehicle A and vehicle B may immediately exchange service information by accessing the SCH-a channel. Also, vehicle C and vehicle D may complete exchange of control signals during a different CCH interval and exchange service information by immediately accessing the SCH-b channel.

The embodiment of FIG. 14 shows that exchange of control signals may be performed during the CCH interval or SCH interval without being distinguished from each other. In other words, in FIG. 14, control signals may be exchanged within an arbitrary time slot within the asynchronous time interval. It should be noted that the embodiment of FIG. 14 may also be applied additionally to the embodiments of FIGS. 11 to 13. In other words, even for the synchronous time interval, control signals may be exchanged in an arbitrary time slot such as the CCH interval or SCH interval as shown in the embodiment of FIG. 14.

Figure 15:
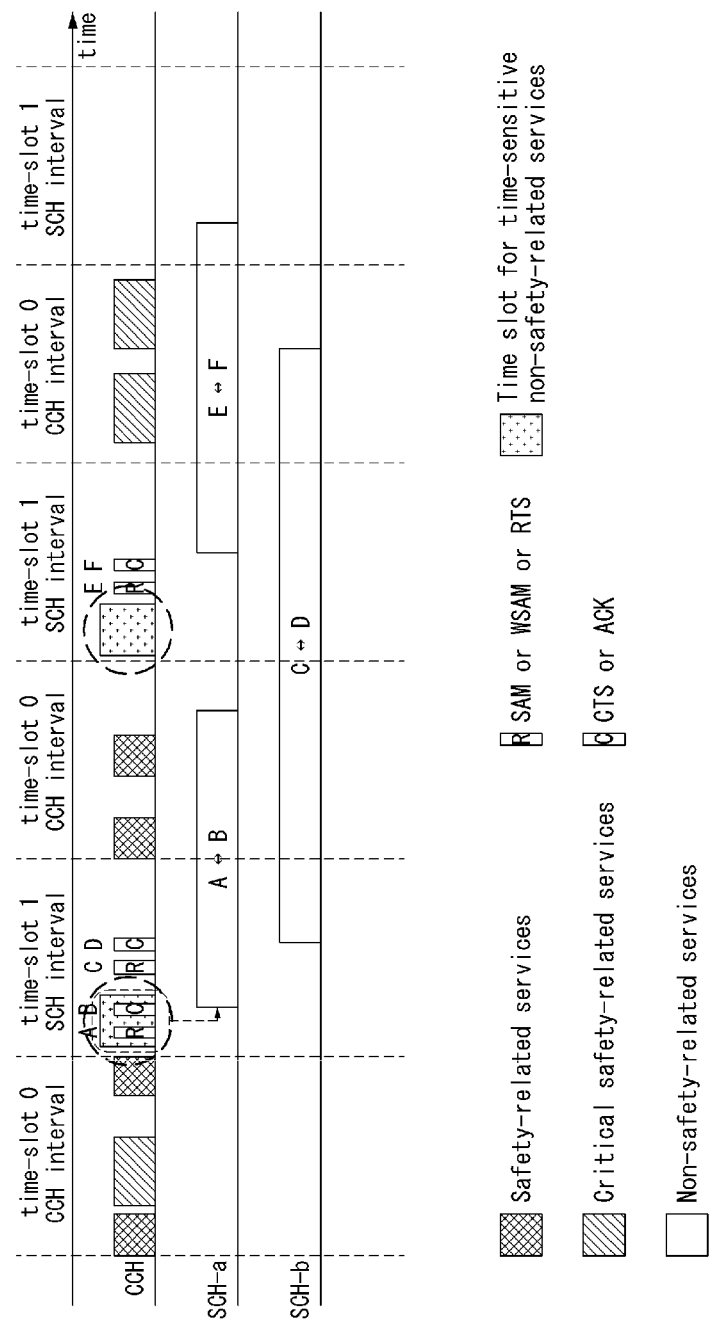
FIG. 15 illustrates a data communication method of a V2X communication device including a dual transceiver according to one embodiment of the present invention.

FIG. 15 illustrates a data communication method of a V2X communication device including a dual transceiver according to one embodiment of the present invention.

As described above, the first transceiver may perform communication through the CCH while the second transceiver performs communication through the SCH.

FIG. 15 illustrates a different operation scenario based on the methods (1) and (2) of the enhanced mode. Although repeated descriptions of FIG. 12 are omitted in the descriptions of FIG. 15, the omitted descriptions may still be applied to the embodiment of FIG. 15.

In the embodiment of FIG. 13, when exchange of control signals through the CCH is completed during the SCH interval, the V2X device may immediately access the designated SCH and perform exchange of information. For example, after completing exchange of control signals in the SCH interval, vehicle A and vehicle B may immediately exchange service information by accessing the SCH-a channel. Also, after exchange of control signals between the vehicles A and B during the SCH interval, vehicle C and vehicle D may complete exchange of control signals and exchange service information by immediately accessing the SCH-b channel.

In the embodiment of FIG. 15, control signals for time-sensitive non-safety-related services may be communicated with the highest priority in the SCH interval. In other words, a time slot for time-sensitive non-safety-related services may be allocated at the very beginning of the SCH interval except for a guard period. In other words, by allocating a time slot dedicated to a specific purpose to the SCH interval, signal/service exchange of time-sensitive services may be performed in a highly reliable manner. The length of an additional time slot may be configured in a variable manner based on the allowed number of exchanged control signals. By using the first transceiver, the V2X communication device may exchange time-sensitive non-safety-related service/message/control signals in the very front of the SCH interval.

The embodiment of FIG. 15 may also be applied to the embodiments of FIGS. 11 to 14.

Figure 16:
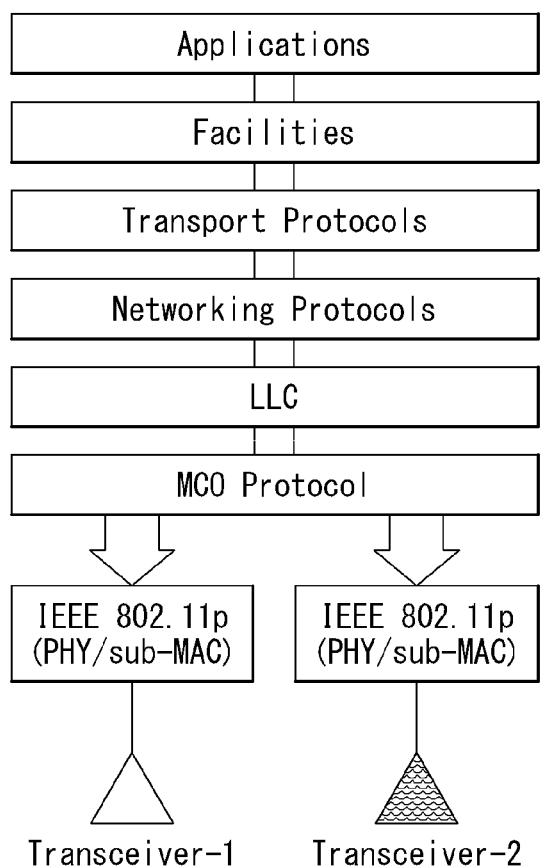
FIG. 16 illustrates architecture of a V2X communication device according to another embodiment of the present invention.

FIG. 16 illustrates architecture of a V2X communication device according to another embodiment of the present invention.

The V2X communication device of FIG. 16 includes two transceivers.

The two transceivers may operate over different bands (frequency bands of 5.4 GHz/5.9 GHz and 63 GHz) having different frequency characteristics. The two transceivers may be controller by one multi-channel operation method or may be controlled independently. The two transceivers may be controlled by at least one MAC layer. Channel access of the two transceivers may be controlled by at least one MCO, as described above.

The two transceivers may be used for different service transmission and reception in the 5.4 GHz/5.9 GHz band and 63 GHz band, respectively. The first transceiver may be used for communication in the 5.4 GHz/5.9 GHz frequency band, and the second transceiver may be used for communication in the 63 GHz frequency band.

Figure 17:
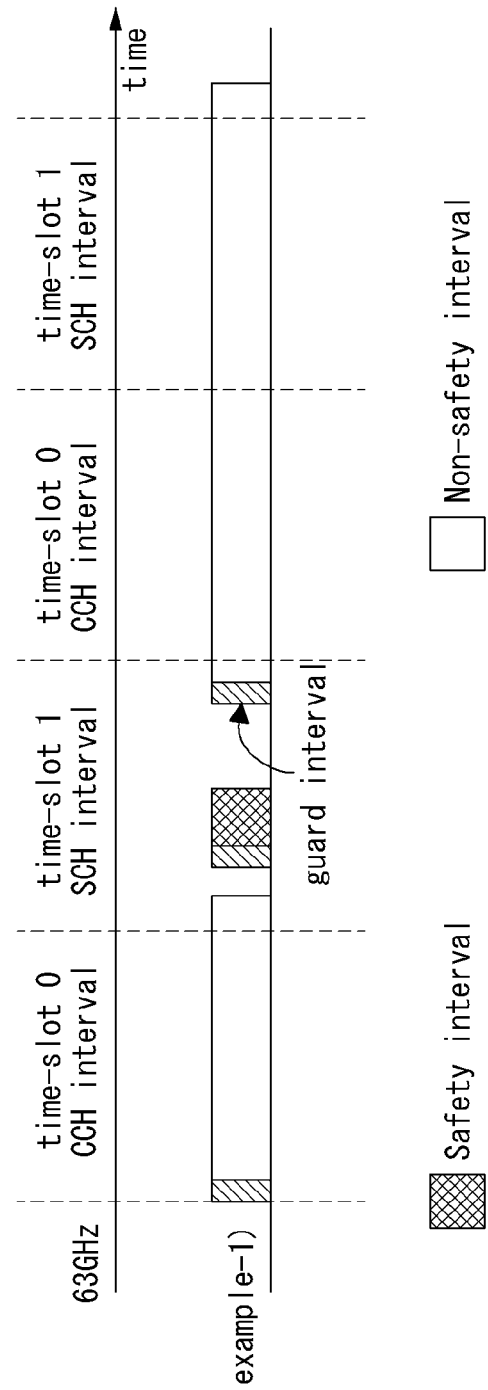
FIG. 17 illustrates a data communication method of a V2X communication device including a dual transceiver according to another one embodiment of the present invention.

FIG. 17 illustrates a data communication method of a V2X communication device including a dual transceiver according to another one embodiment of the present invention.

As described in FIG. 16, the first transceiver may be used for communication in the 5.4/5.9 GHz frequency band, and the second transceiver may be used for communication in the 63 GHz frequency band.

The first transceiver may operate like the single transceiver and the first transceiver of the FIGS. 10 to 15. And the second transceiver may operate as shown in FIG. 17.

The second transceiver may perform negotiation and data exchange continuously in one channel. And safety-related service may be delivered after contention. Services and messages may be delivered without a time boundary limitation between the CCH and SCH intervals.

The second transceiver for communication in the 63 GHz frequency band may perform transmission and reception of high capacity services (for example, sensor data before processing) that have to be provided within a limited time. Since the 63 GHz band may not have the CCH channel differently from the 5.4/5.9 GHz band, a protocol may be requested for exchange of multi-channel operation information, safety-related service/information, and other services, which may be implemented as shown in FIG. 17.

Safety-related service/information communication may be performed by using at least one of the embodiments described with respect to the 5.4/5.9 GHz channel. For those services other than safety-related services, the V2X communication device may immediately perform information exchange once exchange of control signals between a service provider and a user is completed.

In FIG. 17, the V2X communication device may use the second transceiver for providing services intended for the 63 GHz band. The V2X communication device may exchange control signals for providing services intended for the 63 GHz band in each band of the first transceiver or second transceiver. When exchange of control signals is completed in each band, the V2X communication device may perform data communication for providing services intended for the 63 GHz band by using the second transceiver. Safety-related services provided in the 63 GHz band may be communicated in the interval that does not provide services through contention.

In the present specification, negotiation may refer to a control signal exchange process for exchanging information between a device at the service provider side and a device at the user-side. As an embodiment, devices may exchange information required for transmission and reception of data as control signals. And based on the control signal exchange process, namely negotiation process, devices may perform transmission and reception of service data. As an embodiment, control signals exchanged during negotiation may include a service advertising message (SAM) and the corresponding ACK message at the receiver side. Also, control signals exchanged during negotiation may include WAVE service advertising message (WSAM) provided by the service provider and the corresponding ACK message at the receiver side. As another embodiment, transmission and reception of request-to-send (RTS) and clear-to-send (CTS) signals may also be included in the negotiation. In the embodiment of the present invention, transmission and reception of service advertisement information may also be included in the negotiation.

Figure 18:
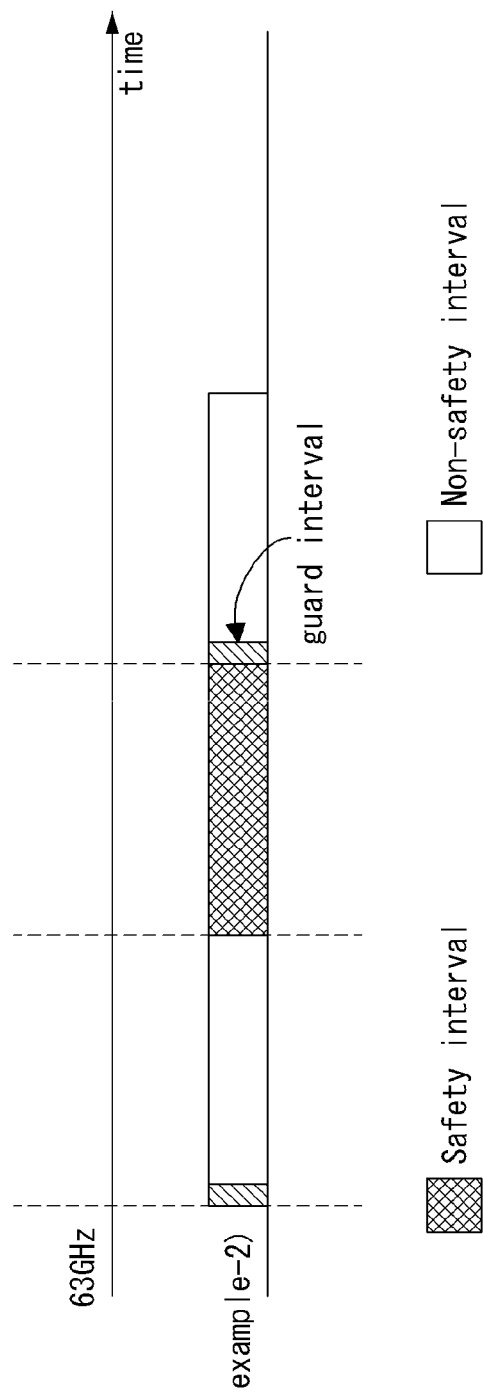
FIG. 18 illustrates a data communication method of a V2X communication device including a dual transceiver according to yet another one embodiment of the present invention.

FIG. 18 illustrates a data communication method of a V2X communication device including a dual transceiver according to yet another one embodiment of the present invention.

As described in FIG. 16, the first transceiver, the first transceiver may be used for communication in the 5.4 GHz/5.9 GHz frequency band, and the second transceiver may be used for communication in the 63 GHz frequency band.

The first transceiver may operate in the same way as the operation of the single transceiver described in FIGS. 7 to 9 or the operation of the first transceiver of the dual transceiver described in FIGS. 10 to 15. And in addition to the embodiment of FIG. 17, the second transceiver may operate as described in FIG. 18.

In the embodiment of FIG. 18, a safety interval and non-safety interval may be allocated for communication in the 63 GHz band. The second transceiver may perform negotiation and data exchange during the non-safety interval. And the second transceiver may exchange safety-related service during the safety interval. As another embodiment, the second transceiver may perform communication based on the operation of a single transceiver described with reference to FIGS. 7 to 9.

Figure 19:
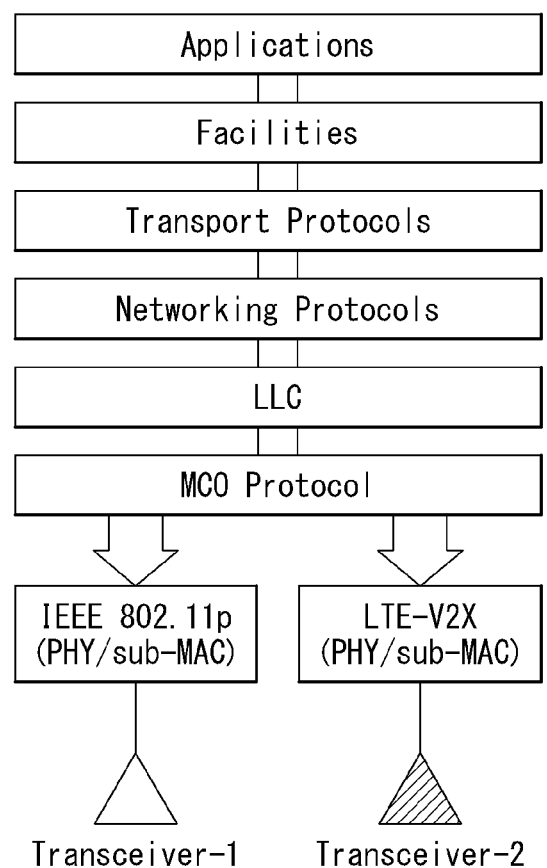
FIG. 19 illustrates architecture of a V2X communication device according to another embodiment of the present invention.

FIG. 19 illustrates architecture of a V2X communication device according to another embodiment of the present invention.

The V2X communication device of FIG. 19 includes two transceivers.

In the embodiment of FIG. 19, the V2X communication device may include a first transceiver performing communication according to the IEEE 802.11p protocol and a second transceiver performing communication according to the Long Term Evolution (LTE)-V2X communication protocol. The first transceiver based on the IEEE 802.11p may be used for communication in the 5.9 GHz and 5.4 GHz frequency bands. The second transceiver based on the LTE-V2X may be used for communication in the 5.9 GHz and 5.4 GHz frequency bands or cellular communication. The LTE-V2X transmission system may provide vehicle-related services by using the 5.4/5.9 GHz frequency band or cellular frequency band.

The application, facility, transport protocol, networking protocol, and LLC layers may be common to the V2X communication device supporting the IEEE 802.11p and LTE-V2X communication. However, considering the two transceivers, the access layer transmitting messages or data received from an upper layer to the physical layer may include two physical layers.

Figure 20:
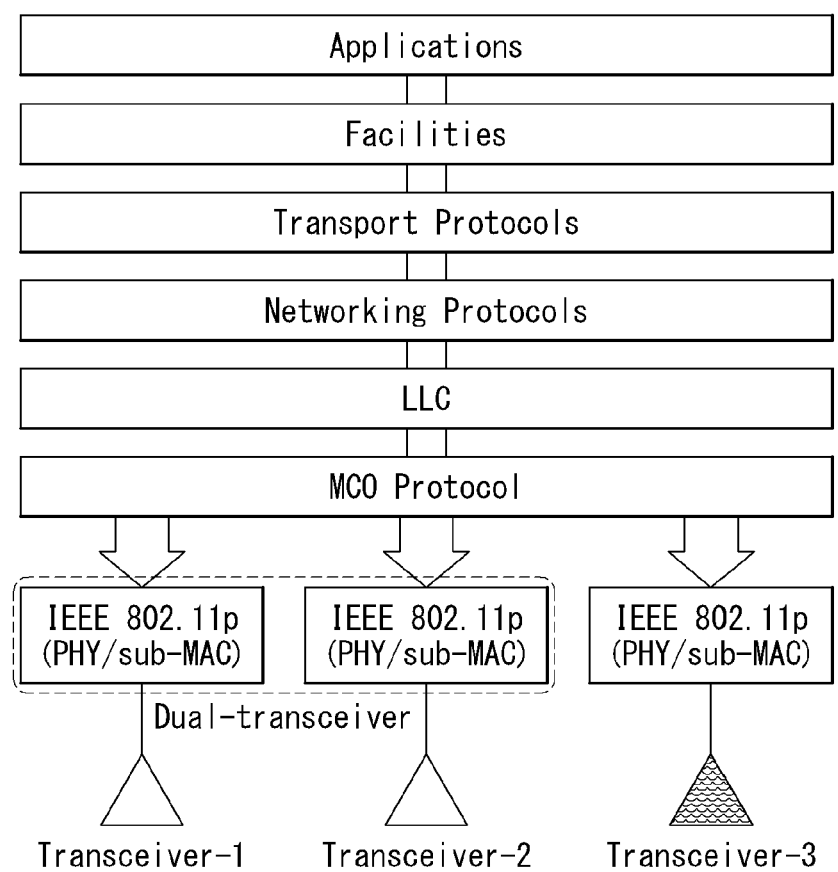
FIG. 20 illustrates architecture of a V2X communication device according to yet another embodiment of the present invention.

FIG. 20 illustrates architecture of a V2X communication device according to yet another embodiment of the present invention.

The V2X communication device of FIG. 20 includes three transceivers.

In the embodiment of FIG. 20, the V2X communication device includes two transceivers based on the IEEE 802.11p protocol, operating in the 5.9 GHz and 5.4 GHz frequency bands and one transceiver based on the IEEE 802.11p protocol, operating in the 63 GHz frequency band. The first and the second transceiver operating based on the IEEE 802.11p may form a dual transceiver. Such a dual transceiver may operate in the same way as described in the embodiments of FIGS. 10 to 15.

The triple transceivers of FIG. 20 may have common upper layers (application, facility, transport, network, and LLC layers). Channel access of the triple transceivers may be controlled by one MCO. The dual transceiver (the first and second transceivers) and the single transceiver (the third transceiver) may have different antenna characteristics.

The dual transceiver may receive channel information from an RSU by using a time slot or time interval synchronized with the RSU. The first transceiver of the dual transceiver may be dedicated to the CCH communication while the second transceiver may be dedicated to the SCH communication. CCH communication of the first transceiver may be performed as described above. The second transceiver may perform service/information communication in a designated SCH based on negotiation in the CCH of the first transceiver.

The third transceiver may receive channel information from an RSU by using a time slot or time interval synchronized with the RSU. The third transceiver may continue to perform the negotiation and data exchange through a single channel. The third transceiver may perform service and message communication without a time boundary limitation between the CCH and the SCH interval. The descriptions about the embodiment of a transceiver for communication in the 63 GHz band given with reference to FIGS. 16 to 18 may be applied to the operation of the third transceiver.

Figure 21:
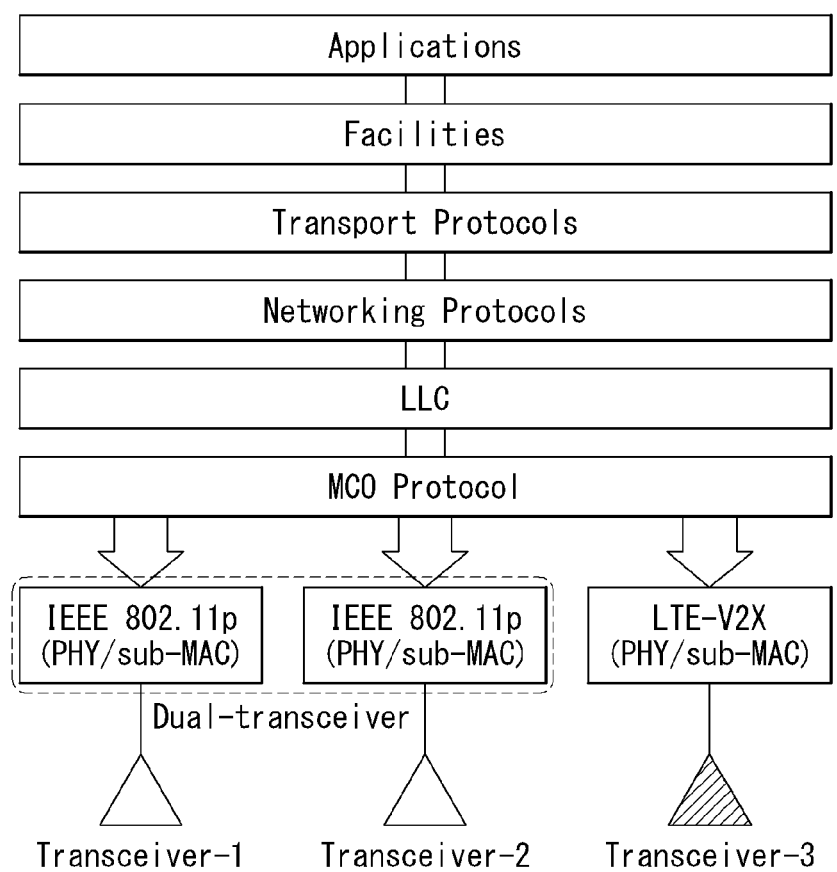
FIG. 21 illustrates architecture of a V2X communication device according to still another embodiment of the present invention.

FIG. 21 illustrates architecture of a V2X communication device according to still another embodiment of the present invention.

The V2X communication device of FIG. 21 includes three transceivers.

In the embodiment of FIG. 21, the V2X communication device includes two transceivers based on the IEEE 802.11p protocol, operating in the 5.9 GHz and 5.4 GHz frequency bands and one transceiver based on the LTE-V2X protocol, operating in the 5.9 GHz, 5.4 GHz, and cellular frequency bands. The first and the second transceiver operating based on the IEEE 802.11p may form a dual transceiver. Such a dual transceiver may operate in the same way as described in the embodiments of FIGS. 10 to 15.

The triple transceivers of FIG. 20 may have common upper layers (application, facility, transport, network, and LLC layers). Channel access of the triple transceivers may be controlled by one MCO. The dual transceiver (the first and second transceivers) and the single transceiver (the third transceiver) may have different antenna characteristics.

The dual transceiver may receive channel information from an RSU by using a time slot or time interval synchronized with the RSU. The first transceiver of the dual transceiver may be dedicated to the CCH communication while the second transceiver may be dedicated to the SCH communication. CCH communication of the first transceiver may be performed as described above. The second transceiver may perform service/information communication in a designated SCH based on negotiation in the CCH of the first transceiver.

The third transceiver may receive channel information from the RSU by using the LTE-V2X protocol. For example, if the LTE-V2X protocol supports an IEEE 802.11 module, the third transceiver may receive channel information from the RSU. Or, the third transceiver may perform communication based on the LTE protocol, where, in this case, upper layers may be configured separately for LTE communication.

Figure 22:
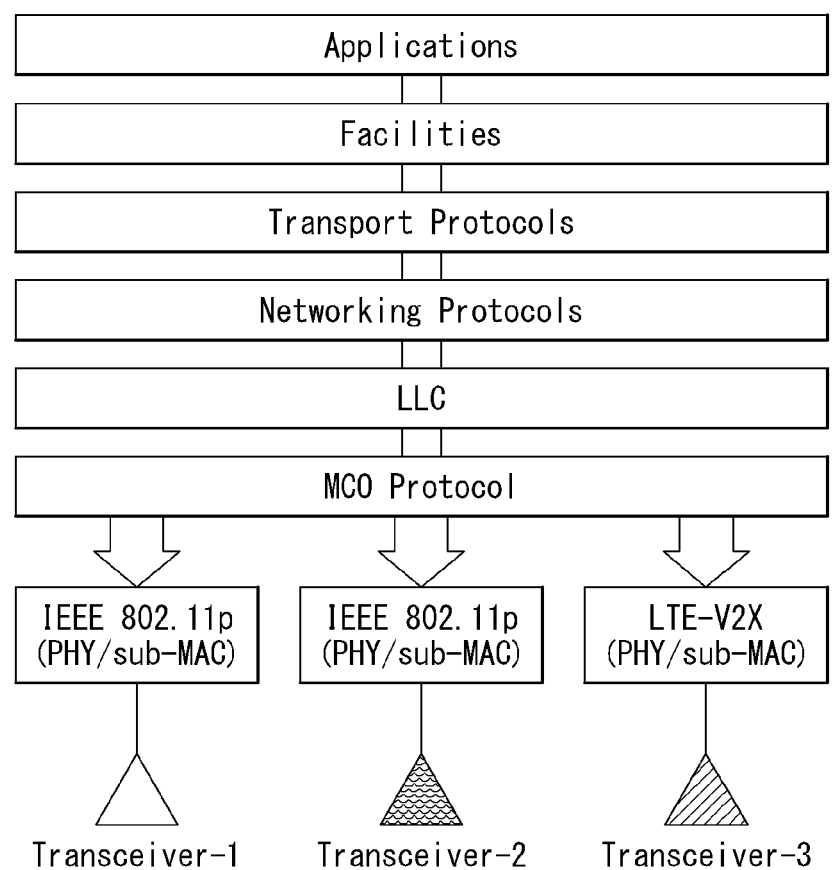
FIG. 22 illustrates architecture of a V2X communication device according to still yet embodiment of the present invention.

FIG. 22 illustrates architecture of a V2X communication device according to still yet embodiment of the present invention.

The V2X communication device of FIG. 22 includes three transceivers.

In the embodiment of FIG. 22, the V2X communication device includes a single first transceiver based on the IEEE 802.11p protocol, operating in the 5.9 GHz and 5.4 GHz frequency bands; a single second transceiver based on the IEEE 802.11p protocol, operating in the 63 GHz frequency band; and a single third transceiver based on the LTE-V2X protocol, operating in the 5.9 GHz, 5.4 GHz, and cellular frequency bands. As an embodiment, the second transceiver may use the 63 GHz and 5.9 GHz frequency bands and operate based on the IEEE 802.11p protocol.

The triple transceivers of FIG. 22 may have common upper layers (application, facility, transport, network, and LLC layers). Channel access of the triple transceivers may be controlled by one MCO. Each single transceiver may have similar or different antenna characteristics. As an embodiment, if the second transceiver supports communication in the 63 GHz frequency band, the first and the third transceivers may have similar antenna characteristics, but the second transceiver may have antenna characteristics different from the first and the third transceiver.

The first transceiver may operate based on the MCO method of a single transceiver. The first transceiver may receive channel information from an RSU by using a time slot or time interval synchronized with the RSU.

The second transceiver may receive channel information from an RSU by using a time slot or time interval synchronized with the RSU. The third transceiver may continue to perform the negotiation and data exchange through a single channel. The third transceiver may perform service and message communication without a time boundary limitation between the CCH and the SCH interval. The descriptions about the embodiment of a transceiver for communication in the 63 GHz band given above may be applied to the operation of the third transceiver.

The third transceiver may receive channel information from the RSU by using the LTE-V2X protocol. For example, if the LTE-V2X protocol supports an IEEE 802.11 module, the third transceiver may receive channel information from the RSU. Or, the third transceiver may perform communication based on the LTE protocol, where, in this case, upper layers may be configured separately for LTE communication.

As described above, the CCH interval or sync interval may include a safety interval and non-safety interval. Additional descriptions about the safety and non-safety intervals are given as follows.

(1) Safety Interval (or Safety Time Slot)

Safety intervals may be allocated for transmission/reception of multi-channel operation information and safety-related service/information to and from nearby vehicles or infrastructure facilities. As an embodiment, a safety interval may be allocated before a non-safety interval by taking into account the fact that safety-related services are of higher importance than other services. As an embodiment, among event messages, a safety-related message may be transmitted and received during the safety interval. Among periodic messages, a safety-related message may be transmitted and received during the safety interval.

Operation of time slots distinguishing safety-related services from other services may improve reliability of safety by avoiding contention with communication signals for non-safety services when the safety-related services are provided. In other words, by avoiding contention among control signals for information exchange between a service provider and a user for a non-safety service and control signals for a safety-related service, delivery of safety-related information may be prevented from being delayed.

(2) Non-Safety Interval (or Non-Safety Time Slot)

Non-safety intervals may be allocated for communication between a service provider and a user for a non-safety service. In other words, non-safety intervals may be provided for exchanging control signals for exchange of information between a service provider and a user. Among the messages, service messages may be transmitted and received in a non-safety interval. A non-safety interval may be allocated after a safety interval by taking into account the fact that non-safety services are of lower importance than safety-related service/information.

Allocation of the timer intervals may be predetermined or configured in a variable manner. An upper layer such as the application layer may indicate whether to include safety and non-safety intervals and lengths thereof. In other words, values related to safety intervals and/or non-safety intervals may be predefined/preconfigured by an upper layer and stored in the MAC sublayer Management Entity (MLME) extension of the management plane through an MLMEX Service Access Point (SAP) of the MAC layer. A method for configuring the values related to a safety interval and/or non-safety interval will be described below.

Figure 23:
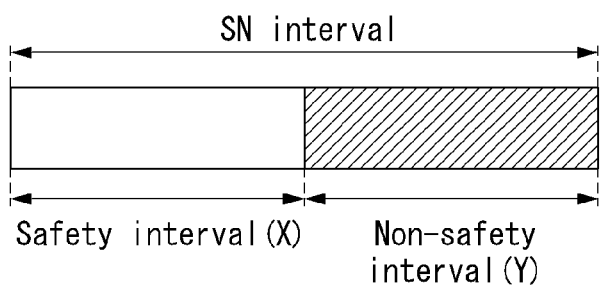
FIG. 23 illustrates a method for adjusting a time interval according to an embodiment of the present invention.

FIG. 23 illustrates a method for adjusting a time interval according to an embodiment of the present invention.

In the embodiment above, a CCH interval or sync interval may include a safety interval or non-safety interval. As shown in FIG. 23(a), a time slot that includes a safety interval and a non-safety interval may be referred to as an SN interval. An SN interval may be defined as a sum of a safety interval (X) and a non-safety interval (Y). An SN interval may be the same as a sync interval minus a guard interval (SN interval=sync interval−guard interval). A safety interval and a non-safety interval may be defined adaptively within the sync interval.

The radio of safety intervals to non-safety intervals may be defined and provided as shown in an interval table of FIG. 23(b). Such an interval table may be defined by using at least one of bits, usage, safe interval (ratio), and non-safe interval (ratio).

The safety interval (X) and non-safety interval (Y) may be calculated respectively by using the ratios provided in the table of FIG. 23(b) and the SN interval as follows.

$$\text{Safety interval } (X) = SN \text{ interval} \times (Sr/(Sr+Nr))$$

$$\text{Non-safety interval } (Y) = SN \text{ interval} \times (Nr/(Sr+Nr))$$

Sr denotes the safety interval radio of FIG. 23(b), and Nr denotes the non-safety interval ratio.

The bit values of FIG. 23(b) may be referred to as interval information/value. Interval information may represent existence of at least one of a safety interval or non-safety interval within a CCH interval and the ratio of each interval. By assigning zero as a ratio value of one particular interval, existence of the corresponding interval may be indicated.

In FIG. 23(b), when the value of interval information is 0000, the CCH interval may include only safety intervals while, when the value of interval information is 0001, the CCH interval may include only non-safety intervals. For example, suppose the SN interval is 12 μs, and the value of interval information is 0011. Then the safety interval may become 8 μs=12×(⅔), and the non-safety interval may become 4 μs=12×(⅓).

The interval information such as shown in FIG. 23(b) may be signaled. In other words, the interval information of FIG. 23(b) may be included in the header of a signal transmitted in the CCH interval. In what follows, the interval information may be referred to as time interval information.

Figure 24:
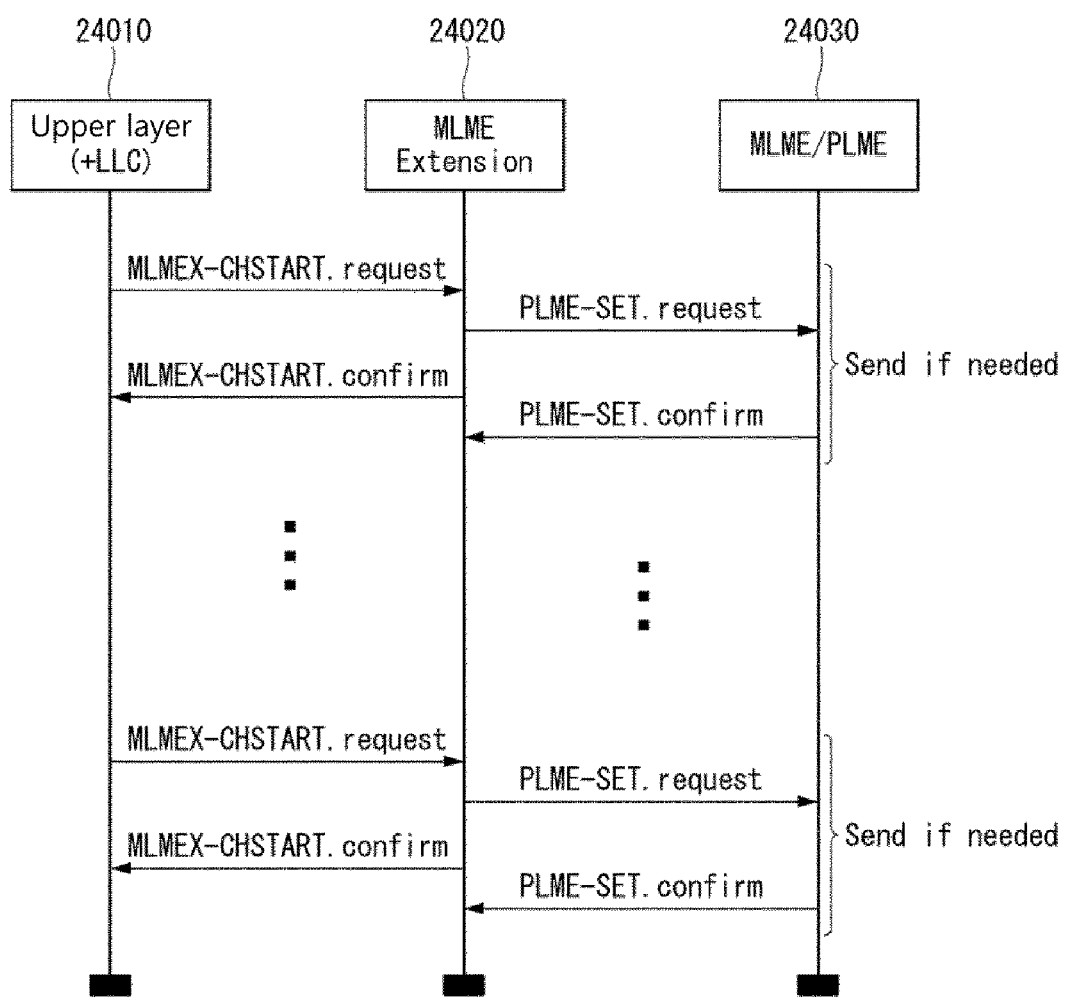
FIG. 24 illustrates a multi-channel operation method of a V2X device according to an embodiment of the present invention.

FIG. 24 illustrates a multi-channel operation method of a V2X device according to an embodiment of the present invention.

In particular, FIG. 24 is a flow diagram illustrating the sequence related to the enhanced mode operation. Similar to what are shown in FIG. 2, the V2X transmission device may include a MAC sublayer Management Entity (MLME), which is an entity that manages the MAC sublayer, and MLME Extension (MLMEX). And the V2X transmission device may include a Physical sublayer Management Entity (PLME) that manages the PHY sublayer.

As an embodiment, the MAC sublayer may provide data services such as channel coordination, channel routing, and user priority. The MAC sublayer may coordinate data resources, handle in/out of the layer data, or control the user priority. As an embodiment, the MLME may provide services such as multi-channel synchronization and channel access. As an embodiment, the MLMEX may control the operation of the 802.11 MLME. In other words, the MLMEX may control the 802.11 MLME for performing the services/operations specified in the IEEE 1609.4.

In the enhanced mode, the V2X device may perform communication by using the aforementioned methods by using an allocated channel during an allocated time interval. Channel allocation and time interval information required for the operation in the enhanced mode may be delivered by using the MLMEX-CHSTART.request information/command. The channel allocation and time interval information may be signaled through an arbitrary method. In the present specification, the MLMEX-CHSTART.request information/command may be referred to as channel start information/command.

As shown in FIG. 24, the channel allocation and time interval information required for the operation in the enhanced mode may be relayed from an upper layer to a lower layer by using the MLMEX-CHSTART.request information. The upper layer 24010 may transmit the MLMEX-CHSTART.request information to the MLMEX 24020, and the MLMEX 24020 may transmit the received information to the MLME/PLME 24030 as PLME-SET.request information. The MLMEX 24020 may transmit the PLME-SET.request to the MLME/PLME 24030 based on the received MLMEX-CHSTART.request information so that current frequency setting may be done with a specific channel number and time interval. The MLME 24030 may not transmit information to the PLME if the MLMEX-CHSTART.request is not received.

FIG. 25 illustrates parameters of MLMEX-CHSTART.request information according to an embodiment of the present invention.

As an embodiment, MLMEX-CHSTART.request information may include parameters as shown in FIG. 25. The MLMEX-CHSTART.request information may include the parameters of FIG. 25 as fields or field values. In what follows, descriptions of the parameters of FIG. 25 are given.

Channel Identifier: The channel to be made available for communication.

Time Slot: The time slot in which alternating access is to be provided.

OperationRateSet: If available, this parameter may be used as specified in the IEEE 802.11 standard document.

EDCA Parameter Set: If available, this parameter set may be used as specified in the IEEE 802.11 standard document.

Immediate Access: As an embodiment, the Immediate Access parameter has an integer value, which ranges from 0 to 255. This parameter indicates the duration of the immediate channel access in sync interval. As an embodiment, the value of 255 may indicate indefinite access. The value of 0 may indicate absence of request. This parameter may also indicate the duration of the immediate channel access in sync interval if the enhanced mode access is available.

Enhanced Mode Access: As an embodiment, the Enhanced Mode Access parameter has an integer value, which ranges from 0 to 2. This parameter may indicate the enhanced mode. The value of this parameter may indicate the aforementioned operation methods of the enhanced mode. For example, if the parameter value is 0, it indicates the first operation method of the enhanced mode; if the parameter value is 1, it indicates the second operation method of the enhanced mode; and if the parameter value is 2, it indicates the third operation method of the enhanced mode.

Time Interval Value: As an embodiment, the Time Interval Value parameter has an integer value, which ranges from 0 to 15. As an embodiment, the Time Interval Value parameter may indicate the table of FIG. 23(b). However, to minimize a burden due to signaling, the Time Interval Value parameter may be configured more simply. For example, when the value of the Time Interval Value parameter is 0 (0000), it may indicate only safe interval; in the case of 1 (0001), the parameter may indicate only non-safety interval; and in the case of 2 (0010), the parameter may indicate co-existence of safety interval and non-safety interval. When the parameter indicates co-existence of safety interval and non-safety interval, the ratio between the intervals may be configured. For example, the ratio between safety services and non-safety services may be configured to be 50% (safety services) and 50% (non-safety services), respectively.

Figure 26:
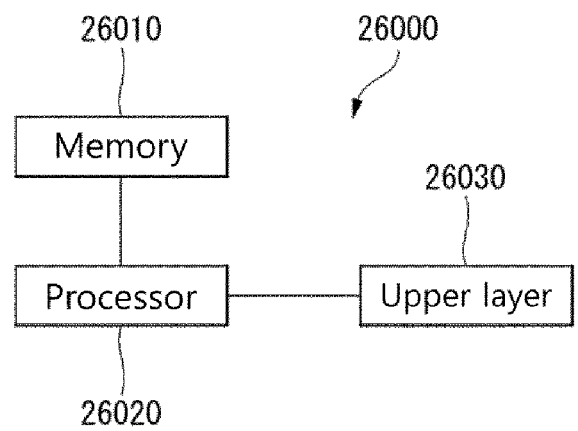
FIG. 26 illustrates a block diagram of a V2X communication device according to an embodiment of the present invention.

FIG. 26 illustrates a block diagram of a V2X communication device according to an embodiment of the present invention.

Referring to FIG. 26, the V2X communication device 26000 may include a memory 26010, processor 26020, and RF unit 26030. As described above, the V2X communication device may be implemented in the form of an On Board Unit (OBU) or Road Side Unit (RSU) or included therein.

The RF unit 26030, being connected to the processor 26020, may transmit/receive a radio signal. The RF unit 26030 may transmit a signal by upconverting data received from the processor 26020 to a transmission and reception band. The RF unit 26030 may include at least one of sub-blocks shown in FIG. 5.

The processor 26020, being connected to the RF unit 26030, may implement the physical layer and/or MAC layer according to the ITS system or WAVE system. The processor 26020 may be configured to perform operations according to various embodiments of the present invention based on the drawings and descriptions given above. Also, at least one of a module, data, program or software that implements the operation of the V2X communication device 26000 may be stored in the memory 26010 and executed by the processor 26020.

The memory 26010, being connected to the processor 26020, stores various pieces of information for driving the processor 26020. The memory 26010 may be included inside the processor 26020 or installed outside the processor 26020 and connected to the processor 26020 via a well-known means.

A specific structure of the V2X communication device 26000 of FIG. 26 may be implemented in a way that various embodiments of the present invention described above may be applied independently or two or more embodiments may be applied together. In particular, the RF unit 26030 of the V2X communication device 26000 of FIG. 26 may include at least one transceiver. In other words, the RF unit 26030 may include two transceivers as shown in the embodiments of FIGS. 10, 16, and 19. Also, the RF unit 26030 may include three transceivers as shown in the embodiments of FIGS. 20 to 22. The V2X communication device may operate based on the detailed descriptions of the respective embodiments.

Figure 27:
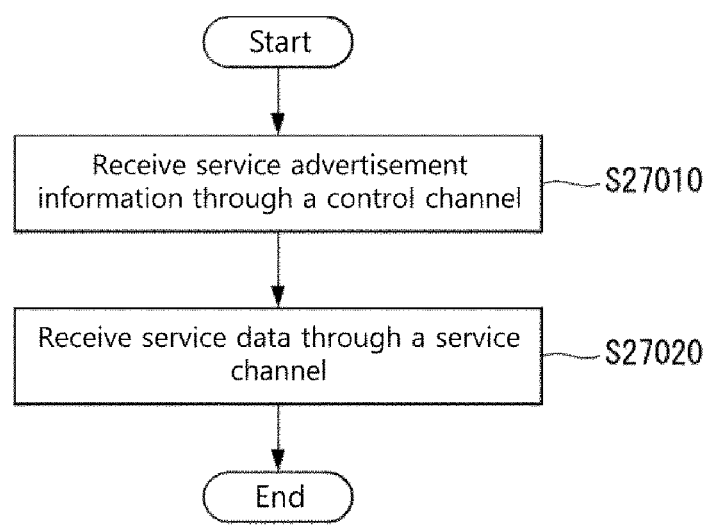
FIG. 27 is a flow diagram illustrating a data communication method of a V2X communication device according to an embodiment of the present invention.

FIG. 27 is a flow diagram illustrating a data communication method of a V2X communication device according to an embodiment of the present invention.

The V2X communication device may receive service advertisement information through a control channel S27010. As described above, the control channel is a channel intended for exchanging system management information or service advertisement information. The V2X communication device may receive service advertisement information through the control channel by using a first transceiver. The service advertisement information may include information required for receiving provided services.

As an embodiment, service advertisement information may identify and specify a service and a channel that provides the service. The service advertisement information may include at least one of header, service information, channel information or routing advertisement information. Channel information of the service advertisement information may provide, in the form of a channel number, information about the SCH that has to be accessed for joining a service. The service information may identify/specific at least one of attribute, configuration, and availability of a service.

The V2X communication device may receive service data through a service channel S27020. The V2X communication device may access a service channel based on the received service advertisement information. As described above, the service channel is a channel intended for transmitting and receiving application data for providing services. The V2X communication device may receive service data through the service channel by using a second transceiver. The V2X communication device may join a service by tuning the second transceiver to the SCH indicated by the channel information included in the service advertisement information.

In the embodiments of the present invention, a sync interval may include at least one of the CCH interval and SCH interval. However, the CCH interval and SCH interval may also be called a first time unit and a second time unit, respectively. Control channel access of the first transceiver and communication through the control channel may be performed based on the sync interval, and the sync interval may include the first and the second time unit.

The first time unit may include a safety interval for safety-related service communication, and the second time unit may include a non-safety interval for non-safety related service communication. Depending on the embodiment, the V2X communication device may receive the service advertisement information during at least one time unit of the first or second time unit.

As shown in FIG. 13, the second time unit may include a critical safety interval for communication of a safety-related service of high importance. As shown in FIG. 15, time-sensitive non-safety related service communication may be performed first within the second time unit. A time slot for communication of a time-sensitive non-safety related service/message/signal may become a sub-time slot included in the second time unit. Such a sub-time slot may be disposed at the very beginning of the second time slot.

According to the embodiments above, the present invention may provide flexible multi-channel operation for V2X communication and improve resource utilization efficiency. Also, the present invention provides a separate transceiver for control channel communication and service channel communication, thereby reducing communication contention among services and improving transmission reliability.

In the embodiments above, the V2X communication device may corresponds to a user device that receives a service. However, the V2X communication device is not limited to the user device. The V2X communication device may correspond to a provider device that provides a service. When the V2X communication device is a provider device, the flow diagram of FIG. 27 may be applied as follows.

The V2X communication device may access a CCH and transmit service advertisement information through the CCH. And the V2X communication device may access an SCH and transmit service data through the SCH. The V2X communication device, as a provider device, may always access a plurality of channels to perform communication. In other words, when the V2X communication device acts as a provider device, steps for CCH access and SCH access are omitted, and the V2X device may transmit service data through the SCH while transmitting service advertisement information through the CCH.

The embodiments described above are combinations of constituting elements and features of the present invention in a predetermined form. Each individual element or feature has to be considered as optional except where otherwise explicitly indicated. Each individual element or feature may be implemented solely without being combined with other elements or features. Also, it is also possible to construct the embodiments of the present invention by combining a portion of the elements and/or features. A portion of a structure or feature of an embodiment may be included in another embodiment or may be replaced with the corresponding structure of feature of another embodiment. It should be clearly understood that the claims which are not explicitly cited within the technical scope of the present invention may be combined to form an embodiment or may be included in a new claim by an amendment after application.

The embodiments of the present invention may be implemented by various means such as hardware, firmware, software, or a combination thereof. In the case of hardware implementation, one embodiment of the present invention may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present invention may be implemented in the form of modules, procedures, functions, and the like which perform the functions or operations described above. Software codes may be stored in the memory and activated by the processor. The memory may be located inside or outside of the processor and may exchange data with the processor by using various well-known means.

It is apparent for those skilled in the art that the present invention may be embodied in other specific forms without departing from the essential characteristics of the present invention. Therefore, the detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

MODE FOR INVENTION

It should be clearly understood by those skilled in the art that the present invention may be changed or modified in various ways without departing from the technical principles and scope of the present invention. Therefore, it is intended that the present invention includes changes and modifications of the present invention defined by appended claims and provided within their equivalent scope.

The present document describes both of the apparatus and the method invention, and descriptions of the respective inventions may be applied in a supplementary manner.

Various embodiments have been described in their best mode for implementing the present invention.

INDUSTRIAL APPLICABILITY

The present invention is used in a range broadcast signal service applications.

It should be clearly understood by those skilled in the art that the present invention may be changed or modified in various ways without departing from the technical principles and scope of the present invention. Therefore, it is intended that the present invention includes changes and modifications of the present invention defined by appended claims and provided within their equivalent scope.

The invention claimed is:

1. A method of communication performed by a V2X communication device including a plurality of transceivers, the method comprising:
receiving service advertisement information through a control channel (CCH) via a first transceiver dedicated to a CCH interval,
wherein the service advertisement information includes (i) service information, (ii) channel information, and (iii) time interval information regarding time intervals consisting of the CCH interval,
wherein the service information includes (i) safety related service data and (ii) non-safety related service data,
wherein the CCH interval includes (i) a guard interval, (ii) a safety interval that communicates the safety related service data, and (iii) a non-safety interval that communicates the non-safety related service data,
wherein the time interval information represents (i) usage of the CCH interval, (ii) safe interval ratio and (iii) non-safe interval ratio, and
wherein the safety interval is allocated before the non-safety interval;
receiving first service data through a service channel (SCH) based on the service advertisement information via a second transceiver dedicated to a SCH interval; and
receiving second service data via a third transceiver regardless of whether an interval at which the second service data is received is the CCH interval or the SCH interval,
wherein the second service data is data other than the safety related service data.

2. The method of claim 1, wherein the SCH interval includes a critical safety interval for safety-related service communication of high importance.

3. The method of claim 2, wherein time-critical non-safety related service communication is performed first during the SCH interval.

4. A V2X communication device comprising:
a memory storing data;
an RF unit configured to transmit and receive a radio signal; and
a processor configured to control the RF unit,
wherein the RF unit includes a first transceiver for control channel (CCH) communication and a second transceiver for service channel (SCH) communication; and
wherein the V2X communication device is configured to:
receive service advertisement information through a control channel (CCH) via a first transceiver dedicated to a CCH interval,
wherein the service advertisement information includes (i) service information, (ii) channel information, and (iii) time interval information regarding time intervals consisting of the CCH interval,
wherein the service information includes (i) safety related service data and (ii) non-safety related service data,
wherein the CCH interval includes (i) a guard interval, (ii) a safety interval that communicates the safety related service data, and (iii) a non-safety interval that communicates the non-safety related service data,
wherein the time interval information represents (i) usage of the CCH interval, (ii) safe interval ratio, and (iii) non-safe interval ratio, and
wherein the safety interval is allocated before the non-safety interval;
receive first service data through a service channel (SCH) based on the service advertisement information via a second transceiver dedicated to a SCH interval; and
receive second service data via a third transceiver regardless of whether an interval at which the second service data is received is the CCH interval or the SCH interval,
wherein the second service data is data other than the safety related service data.

5. The device of claim 4, wherein the SCH interval includes a critical safety interval for safety-related service communication of high importance.

6. The device of claim 5, wherein time-critical non-safety related service communication is performed first during the SCH interval.

7. A processing apparatus configured to control a V2X communication device, the processing apparatus comprising:
- a processor; and
- a computer-readable memory operably connected to the processor and storing instructions that, based on being executed by the processor, control the V2X communication device to perform operations comprising:
- receiving service advertisement information through a control channel (CCH) via a first transceiver dedicated to a CCH interval,
- wherein the service advertisement information includes (i) service information, (ii) channel information, and (iii) time interval information regarding time intervals consisting of the CCH interval,
- wherein the service information includes (i) safety related service data and (ii) non-safety related service data,
- wherein the CCH interval includes (i) a guard interval, (ii) a safety interval that communicates the safety related service data, and (iii) a non-safety interval that communicates the non-safety related service data,
- wherein the time interval information represents (i) usage of the CCH interval, (ii) safe interval ratio, and (iii) non-safe interval ratio, and
- wherein the safety interval is allocated before the non-safety interval;
- receiving first service data through a service channel (SCH) based on the service advertisement information via a second transceiver dedicated to a SCH interval; and
- receiving second service data via a third transceiver regardless of whether an interval at which the second service data is received is the CCH interval or the SCH interval,
- wherein the second service data is data other than the safety related service data.

* * * * *